United States Patent
Bader

(10) Patent No.: US 10,995,027 B1
(45) Date of Patent: *May 4, 2021

(54) EXCHANGING THERMAL AND LIQUID WASTES FOR DISTILLATE AND HOT DE-SCALED BRINE

(71) Applicant: Mansour S. Bader, College Station, TX (US)

(72) Inventor: Mansour S. Bader, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/873,373

(22) Filed: Mar. 31, 2020

Related U.S. Application Data

(63) Continuation-in-part of application No. 16/873,135, filed on Feb. 8, 2020, which is a continuation-in-part
(Continued)

(51) Int. Cl.
*C02F 9/00* (2006.01)
*B01D 15/00* (2006.01)
(Continued)

(52) U.S. Cl.
CPC ............. *C02F 9/00* (2013.01); *C02F 1/004* (2013.01); *B01D 15/00* (2013.01); *C02F 1/20* (2013.01); *C02F 1/441* (2013.01); *C02F 1/442* (2013.01); *C02F 1/444* (2013.01); *C02F 1/5236* (2013.01); *C02F 1/54* (2013.01); *C02F 1/72* (2013.01); *C02F 2103/18* (2013.01); *C02F 2303/20* (2013.01); *C02F 2303/22* (2013.01)

(58) Field of Classification Search
CPC ........................................ E21B 43/16
USPC ................ 202/176; 203/84, 85, 10, 21, 88; 210/638
See application file for complete search history.

(56) References Cited

U.S. PATENT DOCUMENTS

| | | | | |
|---|---|---|---|---|
| 4,439,339 | A | * | 3/1984 | Doumit ................ C02F 1/042 510/100 |
| 5,466,367 | A | * | 11/1995 | Coate ................... C02F 3/10 210/96.1 |

(Continued)

OTHER PUBLICATIONS

Walcott, James W. and Gorgol, Robert G.; "An Evaporation/Crystallization Route to Zero Discharge Power Generation"; AIChE Summer National Meeting, Denver, Aug. 1988.
(Continued)

*Primary Examiner* — Nina Bhat

(57) ABSTRACT

Providing new distilling and/or de-scaling methods and systems herein is a matter of allowing for thermal balance without the need to fill a hot wet emulsion separation system with more steam and heat rejection devices to waste steam. A solutions set begins with efficiently utilizing three types of waste: (1) de-oiled and/or cooled down produced water; (2) blowdown steam from drum-type boilers (DBs); and (3) return condensate of dry steam from the DBs. It ends with: (1) removing calcium hardness, magnesium hardness and silica, thereby recovering them as useful minerals; and (2) producing distillate for viscous oil recovery by steam injection and de-scaled hot brine for improved oil recovery by hot water flooding and/or other related methods. The vehicle to attain this solutions' set is a multi-effect distillation train comprises a backward feed section along with two flashing stages.

20 Claims, 11 Drawing Sheets

Related U.S. Application Data of application No. 16/501,510, filed on Apr. 20, 2019, now Pat. No. 10,577,269, which is a continuation-in-part of application No. 15/731,999, filed on Sep. 7, 2017, now Pat. No. 10,322,952, which is a continuation-in-part of application No. 15/731,626, filed on Jul. 10, 2017, now Pat. No. 10,336,638, which is a continuation-in-part of application No. 13/999,309, filed on Feb. 8, 2014, now Pat. No. 9,701,558, application No. 16/873,373, which is a continuation-in-part of application No. 16/873,136, filed on Feb. 8, 2020, which is a continuation-in-part of application No. 16/501,595, filed on May 6, 2019, now Pat. No. 10,577,257, which is a continuation-in-part of application No. 14/998,774, filed on Feb. 13, 2016, now Pat. No. 10,280,103, which is a continuation-in-part of application No. 14/544,436, filed on Jan. 6, 2015, now Pat. No. 10,259,735, which is a continuation-in-part of application No. 14/544,317, filed on Dec. 22, 2014, now Pat. No. 10,259,734, which is a continuation-in-part of application No. 13/066,841, filed on Apr. 26, 2011, now Pat. No. 8,915,301.

(51) Int. Cl.
| | | |
|---|---|---|
| *C02F 1/00* | (2006.01) | |
| *C02F 1/44* | (2006.01) | |
| *C02F 103/18* | (2006.01) | |
| *C02F 1/72* | (2006.01) | |
| *C02F 1/20* | (2006.01) | |
| *C02F 1/54* | (2006.01) | |
| *C02F 1/52* | (2006.01) | |

(56) References Cited

U.S. PATENT DOCUMENTS

| | | | | |
|---|---|---|---|---|
| 5,866,011 | A | * 2/1999 | McGiffney | C02F 5/10 |
| | | | | 159/47.3 |
| 8,915,301 | B1 | 12/2014 | Bader | |
| 9,539,552 | B2 | * 1/2017 | DeWald | F16M 11/42 |
| 9,701,558 | B1 | 7/2017 | Bader | |
| 9,751,777 | B1 | * 9/2017 | Bader | C02F 9/00 |
| 9,802,845 | B2 | * 10/2017 | Thiers | B01D 1/0011 |
| 10,258,920 | B1 | 4/2019 | Bader | |
| 10,259,734 | B1 | * 4/2019 | Bader | C02F 9/00 |
| 10,259,735 | B1 | * 4/2019 | Bader | C02F 1/06 |
| 10,280,103 | B1 | * 5/2019 | Bader | B01D 3/007 |
| 10,322,952 | B1 | 6/2019 | Bader | |
| 10,336,638 | B1 | * 7/2019 | Bader | C02F 9/00 |
| 10,441,898 | B1 | 10/2019 | Bader | |
| 10,450,202 | B1 | 10/2019 | Bader | |
| 10,450,212 | B1 | 10/2019 | Bader | |
| 10,577,257 | B1 | 3/2020 | Bader | |
| 10,577,269 | B1 | 3/2020 | Bader | |
| 2012/0241386 | A1 | * 9/2012 | Alahmady | C02F 9/00 |
| | | | | 210/709 |
| 2015/0151986 | A1 | * 6/2015 | Fearon | B09C 1/002 |
| | | | | 166/244.1 |
| 2015/0203377 | A1 | * 7/2015 | Wallace | C02F 9/00 |
| | | | | 204/518 |
| 2016/0376933 | A1 | * 12/2016 | Mu | C02F 1/16 |
| | | | | 60/645 |

OTHER PUBLICATIONS

Milhem, M.M. and Ahmed, K.N.; "Performance of a Pilot Cyclic Steam Stimulation Project in Kuwait"; SPE 15733, 1987.
Ahmed, K.N. and Milhem, M.M.; "Operation of a Second Steam Stimulation Pilot Project in Kuwait"; SPE 17987, 1989.

* cited by examiner

EXCHANGING THERMAL AND LIQUID WASTES FOR DISTILLATE AND HOT DE-SCALED BRINE

RELATED APPLICATIONS

This application is a continuation-in-part of my pending patent application Ser. No. 16/873,135 filed on Feb. 8, 2020; which is a continuation-in-part of my patent application Ser. No. 16/501,510 filed on Apr. 16, 2019, now U.S. Pat. No. 10,577,269; which is a continuation-in-part of my patent application Ser. No. 15/731,999 filed on Sep. 7, 2017, now U.S. Pat. No. 10,322,952; which is a continuation-in-part of my patent application Ser. No. 15/731,626 filed on Jul. 10, 2017, now U.S. Pat. No. 10,336,638; which is a continuation-in-part of my patent application Ser. No. 13/999,309 filed on Feb. 8, 2014, now U.S. Pat. No. 9,701,558.

This application is also a continuation-in-part of my pending patent application Ser. No. 16/873,136 filed on Feb. 8, 2020; which is a continuation-in-part of my patent application Ser. No. 16/501,595 filed on May 6, 2019, now U.S. Pat. No. 10,577,257; which is a continuation-in-part of my patent application Ser. No. 14/998,774 filed on Feb. 13, 2016, now U.S. Pat. No. 10,280,103; which is a continuation-in-part of my patent application Ser. No. 14/544,436 filed on Jan. 6, 2015, now U.S. Pat. No. 10,259,735; which is a continuation-in-part of my patent application Ser. No. 14/544,317 filed on Dec. 22, 2014, now U.S. Pat. No. 10,259,734; which is a continuation-in-part of my patent application Ser. No. 13/066,841 filed on Apr. 26, 2011, now U.S. Pat. No. 8,915,301.

BACKGROUND OF THE INVENTION

Health, aquatic life, and environmental protection considerations are of prime importance when it comes to the disposal of effluents from conventional wastewater treatment plants (WWTP) because they do not remove much of the toxicity and nutrients contained in sewage. With looming water shortages, reclamation of effluents has been revisited, attention has been given to hydrophilic membranes in the early 1980s, and some has been implemented in the late 1980s and 1990s. For an unconventional wastewater treatment and reclamation plant (WWTRP), as may be depicted in FIG. 1, the removal of such species from effluents lies at the heart of the treatment. The side chains of about three-quarters of the amino acids comprise polar hydrophilic species, whereas the remaining quarter comprises hydrophobic species. Amphiphilic mixing of these seemingly non-mixable species is the key in steering the folding of proteins that mask endotoxins. The reclamation part of the unconventional WWTRP [e.g., ultrafiltration (UF) and RO hydrophilic membranes] is nothing but splitting the content in effluents; thereby reducing it in their product streams, elevating it in their reject streams, and accumulating some of it within the membrane pores. This is why such hydrophilic membranes have not been accepted by many regulating agencies to reclaim effluents. The alarming levels of endotoxins in all outputs resulting from the treatment and/or reclamation of sewage pose long-term health and pollution risks [e.g., U.S. Pat. Nos. 10,450,202; 10,450,212; and 9,701,558]. For many years; however, a reverse osmosis (RO) reject stream from a WWTRP has been dumped into the sea.

An unconventional sandstone oil reservoir lies within a relatively short distance from a WWTRP. This oil reservoir is considerably very shallow; thereby with considerably low temperature and pressure as well as lower viscosity. It has also higher oil saturation, porosity and permeability. With such unusual overall desirable characteristics in a single oil reservoir, which is unlike viscous or heavy oil deposits elsewhere in the world, this reservoir has every potential for effective oil recovery at a low entry cost. The latter; however, is very critical to unlock this potential due to the high sulfur content (>5 wt %), high total acid number (TAN>3 mg KOH/g) and lower API (~14) of oil. This oil has thus no referential market price, not so much because of the lower API as because of the high sulfur content. It is neither economically amenable for blending with lighter crude (would not reduce the sulfur content below 3 wt % without destroying the market value of lighter crude) nor desirable for conventional refining. Nevertheless, source water is needed to generate steam for the deeper and thicker part of the reservoir, and suitable hot water (alone or in conjunction with carbon dioxide, chemicals, etc.) for the shallower and thin part of the reservoir.

Of what does this oil reservoir need, an opportunity has presented itself. That if the WWTRP's RO reject stream is utilized, the lacking source water for viscous oil recovery will be provided. Not only will the viscous oil be recovered, all hopes of not dumping the WWTRP's RO reject stream into the sea would also not be lost.

However, not only a portion of the WWTRP's RO reject stream will be utilized as source water, but it will also be treated by another redundant new treatment system. This new system comprises clarification including adding a coagulant, a flocculent, lime (hardness) and soda ash (alkalinity); sludge filter press; ozonation; media filtration; ultraviolet (UV) radiation; UF; acidification; de-carbonation/de-aeration; adding more additives including a pH neutralizer, an oxygen scavenger and a scale inhibiter; a RO (or NF) main treatment; an ion exchanging (IE) treatment, and a RO polishing treatment [e.g., Water Online, Jan. 30, 2019; Water World, Feb. 4, 2019]. The purpose of the treatment is to essentially feed once-through steam generators (OTSGs), thereby producing steam for the viscous oil recovery.

The WWTRP originally produced about 2 million barrels per day (BPD) of the RO product stream, and then expanded to produce about 3.2 million BPD. Thus, the amount of the RO reject stream before expansion was about 0.35 million BPD, and about 0.6 million BPD [25.6 million U.S. gallons per day (GPD)] after the expansion at a typical 84-85% RO recovery ratio [RO product flow rate/RO feed flow rate].

Phase I of the viscous oil recovery by steam is divided into two sub-phases. The first sub-phase (IA) essentially requires 100,000 BPD of feed water for OTSGs in the first 4 years to presumably produce about 33,000 barrels of heavy oil per day (BOPD). In the following 6 years (year 5 to 10), the extracted produced water with viscous oil will be used as source water for OTSG in the second sub-phase (IB). This is because the anticipated water cut in viscous oil may be in the order of about 0.77, the anticipated viscous oil production may be in the order of about 66,000 BOPD, and the required water to oil ratio by steam injection may be about 3.33. Thus, the anticipated amount of produced water (about 220,000 BPD), after separating it from viscous oil, may be sufficient for steam injection in the second sub-phase (IB). A mechanical vapor re-compression (MVR) system may then be the produced water treatment system in the second sub-phase (IB). FIG. 2 may depict such a possible MVR system.

That is to essentially say that the first sub-phase (IA) may be a temporary phase to initiate steam injection. The water source and the new system to essentially prepare 100,000

BPD of such water source to feed OTSGs in the first sub-phase (IA) are described above (Paragraphs [0006] and [0007]). The initial capital cost of this new water preparation system alone is about $1.222 billion. This initial capital cost is a portion of a larger initial capital investment, which was contracted in early 2015 [e.g., as referenced in the article of AlKaaoud, et al., SPE 189455, August 2018 (Albawaba Online, "Worst Timing Ever? . . . $4.2 Billion of Heavy Oil Development Contracts", Jan. 11, 2015) and (Mahdi, W., " . . . $7 Billion Heavy Oil Project Amid Cheaper Crude", Bloomberg, Dec. 8, 2014]. This initial capital investment may be subjected to further increments by adjustment orders that usually follow. To date, viscous oil production by steam injection in Phase IA has been delayed [e.g., Petroleum Economist; Feb. 20, 2020].

Table 1 (e.g., average values) reveals that the only three parameters in the WWTRP's RO reject stream that do not meet the OTSGs' feed water specifications are the total hardness (TH), dissolved oxygen (DO) and pH. Yet, this elaborate system to treat a portion of the WWTRP's RO reject stream not only duplicates the reclamation part (UF and RO) of the WWTRP (FIG. 1), but it is also over redundant in itself. It includes three forms of disinfection (chlorination, ozonation, and UV); three forms of filtration (filter press, media filtration, and UF); three forms of total hardness removal (lime/soda ash, a RO or NF/scale inhibitor, and an IE); three forms of de-aeration (a vacuum de-aerator, an oxygen scavenger, and a nitrogen blanket/steam driven de-aerator), and three forms of pH adjustment (lime/soda ash, acid, and a pH neutralizer [sodium hydroxide]). Actually, the triplicate forms of each type of treatment in this new system exceed the duplicate forms of each type of species in "Noah Ark". Interestingly, this new treatment system will produce a third form of waste; that is to say that waste from sewage is now tri-generated in triplicate forms. Earnestly, this new treatment system that will treat a portion of the WWTRP's RO reject stream will hereinafter be referred as the Triplicate-Wastewater Treatment & Reclamation Plant (T-WWTRP).

"Form ever follows function"; said "Louis Sullivan," the famed American architect. However, "function follows purpose". But do the functions of these treatment forms in the T-WWTRP serve the purpose economically and environmentally? Could the purpose be alternatively served by other available economic and/or environmental routes?

The T-WWTRP: To Essentially Prepare 100,000 BPD for OTSGs

The long-known practice in the treatment of boiler feed water with extreme total hardness such as seawater, wherein calcium hardness is much lower than magnesium hardness, was to use soda ash to preferentially remove the total dissolved calcium present as carbonate (bicarbonate) and non-carbonate (sulfate) hardness by about 67-72% at ambient temperature, 78-85% at 60° C., and 90% with recycling a portion of the precipitated calcium carbonate as a seeding agent [e.g., Nalco Chemical Co., Boiler Feedwater Treatment, Bulletin 30, 1961]. The reactions may be simplified as follows:

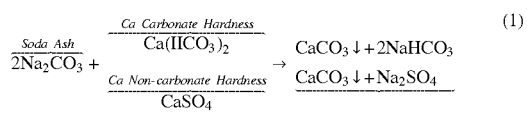
(1)

Since soda ash is expensive, one variation is to use lime for removing the portion of the dissolved calcium present as carbonate hardness followed by soda ash to remove the other dissolved calcium salt (non-carbonate hardness). Another variation is to use an excess amount of lime followed by soda ash and a phosphate source to near complete the removal of calcium along with partial removal of magnesium. A further trimmed variation is to use lime to remove the portion of the dissolved calcium present as carbonate hardness, and hasten the precipitation rate of calcium carbonate and remove the unreacted and/or undissolved amount of the added lime by soda ash.

However, these methods are of ages past not just because of the high operating cost and/or generation of excessive useless wet sludge, but also because the very purpose of removing calcium carbonate is immediately negated by the very function of the added additives. Lime contributes more calcium to the non-carbonate hardness, thereby requiring the removal of the excess calcium resulting from the added lime by soda ash. Soda ash, in turn, contributes more carbonate to the total alkalinity, thereby requiring the removal of the excess carbonate resulting from the added soda ash by combinations of acid, a vacuum de-carbonator/de-aerator, and then a pH neutralizer. Yet, these additives marginally decrease, if not increase, the total hardness; when the total hardness in feed water is either relatively low or high, or when an excess amount of lime is used to remove a substantial portion of magnesium hardness (carbonate and non-carbonate) since it simultaneously substantially increases the calcium non-carbonate hardness.

The reactions that take place for hydrated lime to remove carbonate hardness may be expressed as follows:

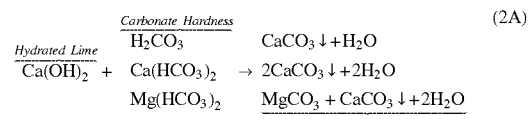
(2A)

In Eq. (2A), carbonic acid does not contribute to the hardness, but it reacts with the hydrated lime, thereby utilizing some of the hydrated lime before the hydrated lime starts removing the calcium hardness. Theoretically, for each 1 mol of calcium ion removed, 2 mol of hydroxyl ion from the hydrated lime is required. Thus, for each 1 mol of calcium carbonate hardness removed, 2 mole of calcium carbonate sludge is produced. The produced magnesium carbonate in Eq. (2A) is relatively soluble, which requires more hydrated lime to remove it:

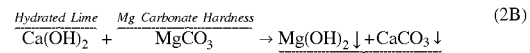
(2B)

A further amount of hydrated lime also removes the magnesium non-carbonate hardness:

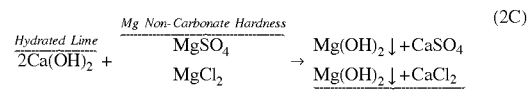
(2C)

Eqs. (2A) through (2C) indicate that for each 1 mol of magnesium hardness, 4 mol of hydroxyl ion from the hydrated lime is required. Thus, for each 1 mol of magnesium hardness removed, 1 mole of magnesium hydroxide and 2 mole of calcium carbonate sludge are produced. It follows that the water now contains the original calcium non-carbonate hardness, and the calcium non-carbonate hardness produced in Eq. (2C). Soda ash can be added to remove the calcium non-carbonate hardness:

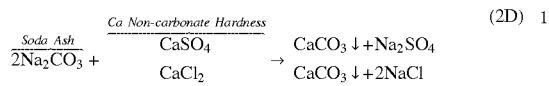
                    (2D)

The required amount of soda ash (0.94 mol) is nearly stochiometrically equal to the sum (1 mol) of the calcium carbonate and calcium non-carbonate hardness (TH) plus the produced calcium non-carbonate hardness [Eq. (2C); if applied]. Because calcium carbonate tends to supersaturate without an excess of soda ash, about 12% excess of soda ash may be required.

A WWTRP's RO reject stream has been tested by the inventor using hydrated lime and soda ash. Table 1 presents the nature of the tested RO reject stream and FIG. 3A illustrates the results. To reach a pH level that allows near complete precipitation of magnesium hydroxide, the hydrated lime dose is fixed at 775 mg/L, which is calculated (in terms of meq./L) as follows:

$$Ca(OH)_2 = H_2CO_3 + HCO_3 + Mg + 4 \quad (2E)$$

However, at a pH of about 10.6-10.8 whereby magnesium hydroxide starts precipitating, the required hydrated lime is about 675 mg/L (about 0.87 of the hydrated lime dose).

FIG. 3A indicates that the total hardness in the tested RO reject stream is reduced by 18% and 10% at, respectively, stochiometric fractions of about ⅓ and 1.0 of the fixed hydrated lime dose (775 mg/L). The calcium hardness decreases by about 28% at about ⅓ of the fixed hydrated lime dose (775 mg/L) but substantially increases by 130% at the full dose of the fixed hydrated lime. In other words, the calcium hardness at the full dose of the fixed hydrated lime, as the only additive, is higher than the original calcium hardness in the tested WWTRP's RO reject stream. The magnesium hardness marginally increases by about 3% at about ⅓ of the fixed hydrated lime dose (775 mg/L) but expectedly decreases by about 96% at the full dose of the fixed hydrated lime. Since the original magnesium hardness is about ⅓ of the total hardness, the higher removal of the magnesium hardness at the full dose of the fixed hydrated lime offsets the substantial increase in the calcium hardness at the same dose. When soda ash in the amount of 1,110 mg/L is added in a combination with the full dose of the fixed hydrated lime (775 mg/L), about 93% of TH is removed. The pH is dropped to 10.3, since the added soda ash produces calcium carbonate, thereby consuming hydroxyl ions. The concentration of sulfate essentially remains the same, whether hydrated lime is used alone or in a combination with soda ash.

A precipitation method may be of a useful utility if the cost of additives is low and/or the value of the precipitating compounds is high. Neither soda ash is inexpensive, nor do the precipitating compounds bear any value (a non-selective useless mixture of calcium carbonate, calcium phosphate, magnesium hydroxide and transition metals laced with extreme toxicity).

It is the nature of domestic wastewater treatment to fluctuate in terms of species content (Table 1). Such fluctuations may be within an expected average range, but some may be unexplainable abnormal outliers. For example, the TH of the extreme outlier (Table 1) is relatively high, which requires 1,100 mg/L of fixed hydrated lime dose and 2,800 mg/L of soda ash in order to reduce the TH by about 90%.

To reduce the cost of additives and minimize the generation of excessive toxic wet sludge, and since the hydrated lime/soda ash is the first main step in the three main steps (RO or NF as a second main step followed by ion exchanging as a third main step) of the T-WWTRP, this first main step is essentially used for marginally reducing TH in order to improve the recovery ratio of RO or NF (the second main step). Thus, calcium carbonate hardness is partially marginally removed by treating a WWTRP's RO reject stream with a sufficient amount of hydrated lime to convert dissolved carbonates (carbonic acid and bicarbonate) to calcium carbonate. For a design purpose entailing normal average species content as well as abnormal species content, the amount hydrated lime dose may be taken within about 0.5 of the fixed hydrated lime dose (1,100 mg/L) when species content in the RO reject stream is at an abnormal level, which would remove about 20% of the TH. This amount of hydrated lime coincides with about 0.7 of the fixed hydrated lime does (775 mg/L) when the species content in the WWTRP's RO reject stream is at a normal average level. This would limit the amount of soda ash for essentially removing the unreacted and/or undissolved amount of calcium resulting from the addition of hydrated lime, hasten the precipitation of calcium carbonate, and slightly increase the pH. This reaction may be expressed as follows:

                    (2F)

In consequence, calcium in a treated WWTRP's RO reject stream resulting from the first main step (hydrated lime/soda ash) of the T-WWTRP may be reduced by about 10-20%. This may result in losing about 5% of the water content and producing about 23,000 tons per year of toxic wet sludge to be hauled away (roughly about 1,400 semi truck loads of sludge per year). This, in turn, (after ozonating, media filtering, UV radiating, filtering by UF, acidifying, de-carbonating/de-aerating, pH neutralizing, oxygen scavenging, and scaling inhibiting) limits the recovery ratio of the followed RO to about 50% or NF to about 70%. The recovery ratio of either RO or NF, as the second main step in the T-WWTRP, is controlled by the saturation limit of calcium sulfate dihydrate (gypsum). The tradeoff between using RO or NF as the second main step is summarized as follows. RO rejects all ions nearly equally; thereby the high removal of calcium and magnesium is useful in reducing their loads on the following IE (the third main step). The high removal of calcium and sulfate imposes a limit on their concentrations in the RO reject steam; thereby the RO recovery ratio may be confined to about 50%, where calcium and sulfate concentration in the reject stream are nearly doubled. NF allows most monovalent ions (sodium, potassium and chloride) to pass through; but partially rejects monovalent bicarbonate and divalent cations (magnesium and calcium), and highly rejects the divalent sulfate. The partial removal of calcium and high removal of sulfate allow a higher NF recovery ratio compared to RO, which may be limited to about 70%, wherein the sulfate concentration in the NF reject stream may be about 3.3-times higher than its concentration in the NF feed stream. RO for sulfate removal would be considered only when monovalent ions and divalent cations must also be removed since the RO reject stream would be about 50%. NF costs less for effective sulfate removal than RO when the removal of monovalent ions is not necessary and near complete removal of divalent cations is not a must since NF operates at a slightly lower pressure and a higher recovery ratio (reject stream about 30%) than RO. As such, about 55% of the WWTRP's RO reject stream that feeds the T-WWTRP will be lost as liquid waste if RO is used as the second main step along with the lime/soda ash as the main first step; or about 35% if NF is used instead as the second main step. Since the T-WWTRP comprises a multitude of filtration, IE resin regeneration and disposal steps; all of which require significant amounts of quality water (backwashing, regenerating ion exchanging resins, buffering disposal wells, etc.), the thereby further RO polishing step may be mostly dedicated to produce such water for such extra utilities.

FIG. 3B illustrates the waste paths of the T-WWTRP to treat a portion of the WWTRP's RO reject stream. About ½ to ⅔ of the WWTRP's RO reject stream will continually be dumped into the sea, and about ⅓ to ½ of the WWTRP's RO reject stream will be treated by the T-WWTRP, where the latter will reject about ⅓ to ½ of its feed into aquifer waters (disposal wells) and settling ponds. The toxicity of the entire WWTRP's RO reject stream will now be distributed among the sea, aquifer waters, as well as settling ponds, evaporation pits or landfills. The latter could also be an indirect path to contaminate shallow groundwater and brackish water. This partial solution for the disposal of WWTRP's RO reject stream problem has now created several new ones. Neither dilution in seawater (the WWTRP's RO reject stream) nor dilution by expanding distributions in seawater (the WWTRP's RO reject stream), aquifer waters and settling ponds (T-WWTRP) is a solution to toxic pollution.

Alternative Economic and/or Environmental Routes

One immediately available option for the temporarily first sub-phase (IA) and beyond is using 3% of the RO product stream from the WWTRP [100,000 BPD, and may be little more for other minor utilities such as washing/de-salting recovered oil and seal flush, out of about 3.2 million BPD) to feed OTSGs. The full cost ($0.10325/barrel) of purchasing 100,000 BPD of this WWTRP's RO product stream in the entire 4 years (phase IA), for example, would be about $15.1 million, whereas the purchasing cost of the same amount in the entire 4 years at the subsidized rate (discounted by 76.3%) would be about $3.6 million. This full cost of purchasing 100,000 BPD of the WWTRP's RO product stream in the entire 4 years is 81-fold less than the initial capital cost (about 1.2% of the initial capital cost) of the T-WWTRP to prepare 100,000 BPD from the WWTRP's RO reject stream to-feed OTSGs; excluding further adjustment orders and operating costs of the T-WWTRP. Yet, the discounted cost of purchasing 100,000 BPD of the WWTRP's RO product stream in the entire 4 years is 394-fold less than the initial capital cost (about 0.25% of the initial capital cost) of the T-WWTRP to prepare 100,000 BPD from the WWTRP's RO reject stream to feed OTSGs. This WWTRP's RO product stream is more suited for "Direct Non-Potable Uses" (e.g., boilers or cooling towers) than "Non-Direct Potable Uses" (e.g., irrigation and/or augmentation of aquifer waters). In fact, about 68,000 BPD of this WWTRP's RO product stream is donated in late 2015 to a university to feed once-through cooling towers of the university's air conditioning system. Some of this WWTRP's RO product stream is also diverted to artificial lakes in Wildlife Protected Areas, a scientific club, a hunting club, etc. Some farmers, the main designated end users of this WWTRP's RO product stream, may refrain from using it because of potential toxicity (transferring via food chain supplies), low TDS (clogging soil pores), and low SAR (no value to crops) even though it is provided to them at a substantially subsidized rate. If this 3% (or so) of the WWTRP's RO product stream that costs either 1.2% or 0.25% of the initial capital cost of the T-WWTRP to prepare 100,000 BPD from the WWTRP's RO reject stream was utilized, the viscous oil recovery project would have been implemented 10 years ago or so when referential prices of crude oil were at their peaks and the real market price for a barrel of heavy oil with lower sulfur content (<3 wt %) was then within the range of $20 [e.g., SPE 127477; 2009]; not delayed to this day when the barrel of this heavy oil does not have an intrinsic commercial value in itself, yet the estimated cost of producing it may be in the order of $57. Based on a realistic boom market price of a barrel of heavy oil that reportedly falls within the order of $20 [SPE 127477; 2009], the very heavy overall initial capital investment that reportedly falls within $7 billion [SPE 189455; 2018] (ignoring adjustment orders, possible corrective modification costs in Phase IA, possible MVR costs in Phase IB, and the actual operating costs), and the assumption that the anticipated heavy oil production matches actual production in the 10 year life of the steam injection project, this initial capital investment will be largely unrecoverable.

Another immediately available option for the first sub-phase (IA) and beyond is using a portion of an effluent stream from any nearby conventional wastewater treatment plant (WWTP) or a portion of the effluent stream from the WWTRP itself, and treat it by an ion exchange system with a closed regeneration cycle. The full cost ($0.06/barrel) of purchasing 100,000 BPD of the effluent stream in the entire 4 years, for example, would be about $8.8 million, whereas the purchasing cost at the subsidized rate (discounted by 80%) would be about $1.8 million. The cost of a conventional ion exchange system to treat 100,000 BPD of an effluent stream would be in the order of about $4 million. The ion exchange system is essentially nothing but fiber glass tanks, pumps and valves; thereby it can be assembled in-house. The salinity in terms of total dissolved solids (TDS) of an effluent stream from a conventional WWTP or a WWTRP (Table 1) is within the salinity of potable water, and the total hardness and sulfate are low; all of which allow effective removal of total hardness by an ion exchange system using sodium chloride as soft brine (the cheapest additive) to regenerate the resin in a closed cycle. In fact, calcium and magnesium concentrations in the effluent stream (Table 1, ES-A) are about 3-times less than their correspondent concentrations in the NF product stream (Table 2, NF-PS), if NF will be used as the second main treatment step prior to the ion exchange in the T-WWTRP [based on the inventor's testing of a WWTRP's RO reject stream (Table 1, RORS-T). Because the volume of the regeneration stream (e.g., sodium chloride soft brine) is very small and the effluent stream may be toxic, the closed regeneration cycle may comprise the steps of, for example, using soda ash [Eq. (1)] to remove calcium hardness (the only calcium hardness) followed by sodium hydroxide (instead of lime) to remove magnesium hardness from the spent sodium chloride brine, and a vacuum filter to convert precipitates to dry cake. The dry cake can be transferred safely to a designated Class II landfill. The sodium chloride soft brine can be neutralized by hydrochloric acid and recycled continuously to regenerate exhausted ion exchange resins, instead of rejecting it into disposal wells and/or settling ponds. Applying the original soda ash treatment to this very small volume of the IE reject brine is by far cheaper than applying it to the WWTRP's RO reject stream as a first main treatment step. It also eliminates the entire excessive waste generation situations and their ramifications as may be depicted in FIG. 3B; thereby eliminating their logistic burdens and environmental liabilities.

A further option is financing an entire power-seawater co-generation plant with an investment equivalent or far less the initial cost of the T-WWTRP to prepare 100,000 BPD from the WWTRP's RO reject stream to feed OTSGs. Nearly within the time frame of contracting Phase IA of the steam injection project, a complete power-seawater co-generation plant was also contracted in late 2014 [may be referred as an Independent Water and Power Plant (IWPP)]. The power co-plant of this IWPP produces about 1,500 MW, the seawater desalination co-plant produces about 130 million GPD (3.1 million BPD) of distilled water, and the IWPP is actually put into service in September 2016. The total cost of this IWPP is $1.4 billion; out of which $437 million for the seawater desalination co-plant, which comprises 10 desalination trains and each produces about 13 million GPD (310,000 BPD). 60% of the total cost of the IWPP is provided by a governing entity and the rest by a consortium of private investors. The 40% share by the private investors gives them, in turn, the right to sell the produced power and drinking water to the governing entity at a pre-determined price for forty years. Yet, strangely, the required fuel to power the IWPP is supplied to the private investors for free. It should obviously alternatively make sense, instead of spending $1.222 billion as the initial capital cost of the T-WWTRP, to: (1) invest $560 million (the 40% share of the private investors in the IWPP), if not entirely owning the IWPP or building a similar plant in a location closers to the viscous oil reservoir; (2) use only one-third of the produced distilled water from only one desalination train (3.2% of the total distilled water production of the entire desalination co-plant) for the steam injection project; and (3) sell or donate the rest of the produced distilled water along with the produced power to the governing entity. It is the oil company, after all, that provides the fuel to the private investors of the IWPP for free; owns the viscous oil reservoir; and spends $1.222 billion as the initial capital cost of the T-WWTRP to prepare 100,000 BPD of feed water to produce steam in hope for producing 33,000 BOPD of viscous oil in Phase IA. This imaginative investment can be extended a little further to: (1) use only two-thirds of the produced distilled water from only one desalination train (or the entire production of one desalination train for that matter) for it is steam injection project in Phase IB and beyond because the power requirement for a MVR system (e.g., FIG. 2) may be about 900 MWh (which is about 60% of the produced 1500 MW from the IWPP) to treat 220,000 BPD of produced water; or at least (2) divert 900 MWh from the IWPP to power the possible MVR system. If the T-WWTRP that essentially prepares 100,000 BPD from the WWTRP's RO reject stream costs at least $1.222 billion to feed OTSGs in Phase IA, the cost of the possible MVR system to treat 220,000 BPD of produced water in Phase IB will be much higher.

Yet, a further option is treating the entire WWTRP's RO reject stream at its source to safe guard public health, aquatic life and environment. The RO reject stream, as the WWTRP originally contracted, should be treated by a zero-liquid discharge (ZLD) brine evaporator, but it should not dumped into the sea. The cost of the brine evaporator was then about $50 million, but it has never been implemented; thereby dumping of WWTRP's RO reject stream into the sea continues to this day. On the other hand, drinking water comes only from seawater desalination plants. Seawater is therefore the source water for desalination plants, and the dumping of WWTRP's RO reject stream is an indirect path for endotoxins to drinking water, let alone the observed eutrophication and persistence death of aquatic life. Endotoxins are notoriously resistant to destruction by heat (stable at 120° C., which is higher than the top brine temperature of any existing desalination plant) and various disinfection methods including chlorine. Health standards are absolutely correlated with water quality. There cannot be any danger to public health, even if they were enough oil resources to produce wealth, to satisfy an energy supply situation, or to meet an oil production target, unless there is intrinsic water quality. If the $1.222 billion initial capital cost of the T-WWTRP in Phase IA was imaginatively added to the cost of the anticipated MVR system to treat 220,000 BPD of produced water in Phase IB, and their combined cost was, instead, fully dedicated to build the brine evaporator that supposed to cost $50 million in the early 2000s to treat the entire WWTRP's RO reject stream, it would at least serve a far greater purpose (protecting public health) in addition to the steam injection project in Phase IA, Phase B, and beyond. But even if exponential spending was not an issue, the counter obvious problem would be the power requirement for a MVR system to treat about 600,000 BPD (the entire WWTRP's RO reject stream), which may be about 2,400 MWh (about 60% more than the produced power from the IWPP). An example of such an energy-intensive brine evaporator was presented by Walcott and Gorgol [1988].

THE OBJECTIVES OF THE INVENTION

Any pattern with an essential notion that does not economically and environmentally distinguish between means (by which an entity is seeking to get there) and ends (for which an entity is striving) cannot match any real situation. The same goes for any pattern with an essential notion that does not diagnose with a bird's-eye perspective before prescribing. Neither pattern is sustainable for a long period because either one is entirely wrong at the start. Of concern here; however, are the environmental burdens and the long term effects on public health and aquatic life.

Here, too, this invention sets out to solve a foreseeable problem that could easily halt the full scale operation of the steam injection project within a short period of time. That is the plugging of disposal wells, as an eventual consequence of excessive liquid waste generation. The co-extracted produced water with the viscous oil by steam injection alone, which is rich in total (calcium and magnesium) hardness and silica, and/or the liquid waste generation from the T-WWTRP (e.g., sulfate-rich RO or NF reject stream and calcium/magnesium rich IE brine stream) are incompatible with the nearly calcium sulfate saturated aquifer water. Adding scale inhibitors, filtering, buffering with potable water, and/or combinations thereof prior to injecting would not mitigate the scale issues in disposal wells. Nor are maintaining a higher injection pressure than the pressure of disposal wells, and cleaning workovers by chemical means (e.g., acid stimulation) and/or mechanical means (e.g., a slick line, reaming, a rig to re-drill an obstructed hole) of the disposal wells sustain injection longevity. Disposal wells may seem a refuge for excessive liquid waste generation because dumping, of course, simplifies a complicated problem, but the scale issues under consideration cannot be over simplified by relying on useless water compatibility predictive models.

Thus, the definite chief objective is treating produced water in its entirety, instead of dumping it in disposal wells, by converting it to utilizable products.

BRIEF SUMMARY OF THE INVENTION

The T-WWTRP and OTSGs are about marrying steam injecting with viscous oil extracting from the subsurface formation. Some of this consumed thermal energy dissipates in downhole and some appears in the end temperature of the produced wet emulsion at a surface facility. Yet, in order to separate oil from water at the surface facility, the thermal energy that appears in the end temperature of the produced wet emulsion is partially rejected, then augmented by more high quality steam from drum-type boilers (DBs), and thereafter rejected by a multitude of heat rejection devices. This invention is a matter of designing new distilling and/or de-scaling methods that allow for more energy balance and efficient thermal utilization without the need to fill a hot wet emulsion separation system with more steam and heat rejection devices to waste steam One embodiment of this invention begins with utilizing two types of waste; one is de-oiled and/or cooled down produced water, and the other is blowdown steam from DBs. It ends with removing calcium hardness, magnesium hardness and silica, thereby recovering them as useful minerals, and producing de-scaled pre-heated brine for hydrocarbons (including oil) recovery from a subsurface formation. The vehicle to attain this set of objectives is two flashing stages.

Another embodiment of this invention begins with utilizing three types of waste; one is de-oiled and/or cooled down produced water, a second one is blowdown steam from DBs, and a third one is return condensate of dry steam from the DBs or steam from a standalone fired heater fueled by sour gas from the viscous oil recovery by steam injection. It ends with removing calcium hardness, magnesium hardness and silica, thereby recovering them as useful minerals, and producing distillate for viscous oil recovery by steam injection, and de-scaled hot brine for improved oil recovery by hot water flooding and related methods. The vehicle to attain this set of objectives is an inventive multi-effect distillation (ME) train comprising a backward feed section (BFS) and two flashing stages. FIG. 4 summarizes this embodiment.

A further embodiment of this invention begins with utilizing three types of waste; one is de-oiled and/or cooled down produced water, a second one is blowdown steam from DBs, and a third one is return condensate of dry steam from the DBs or steam from a standalone fired heater fueled by sour gas from heavy oil recovery by steam injection. It ends with removing calcium hardness, magnesium hardness and silica, thereby recovering them as useful minerals, and producing distillate for viscous oil recovery by steam injection, and de-scaled brine for improved oil recovery by water flooding and related methods. The vehicle to attain this set of objectives is an inventive (ME) train comprising a BFS and a forward feed section (FFS) along with two flashing stages.

A further embodiment of this invention begins with utilizing three types of waste; one is de-oiled and/or cooled down produced water, a second one is blowdown steam from DBs, and a third one is return condensate of dry steam from the DBs or steam from a standalone fired heater fueled by sour gas from heavy oil recovery by steam injection. It ends with removing calcium hardness, magnesium hardness and silica, thereby recovering them as useful minerals, and producing distillate for viscous oil recovery by steam injection, and de-scaled brine for improved oil recovery by water flooding and related methods. The vehicle to attain this set of objectives is an inventive recycle brine multi-effect distillation (RB-ME) train comprising a FFS and a BFS along with and two flashing stages.

The inventive methods are not restricted to use in connection with one particular application. These methods can be used, in general, to treat any feed stream, by de-oiling and/or de-scaling the feed stream, and by producing distillate and de-scaled brine from the de-scaled feed stream. Further objects, novel features, and advantages of the subject invention will be apparent to those skilled in the art upon examining the accompanying drawings and upon reading the following description of the preferred embodiments, or may be learned by practice of the invention. Those of ordinary skills in the art will appreciate that the subject invention can be modified or adapted in a variety of ways. All such modifications or adaptions, which fall within the scope of the appended claims, are intended to be covered.

DESCRIPTION OF THE PREFERRED EMBODIMENT

The Waste "Thermal" Generation

Figure 1:
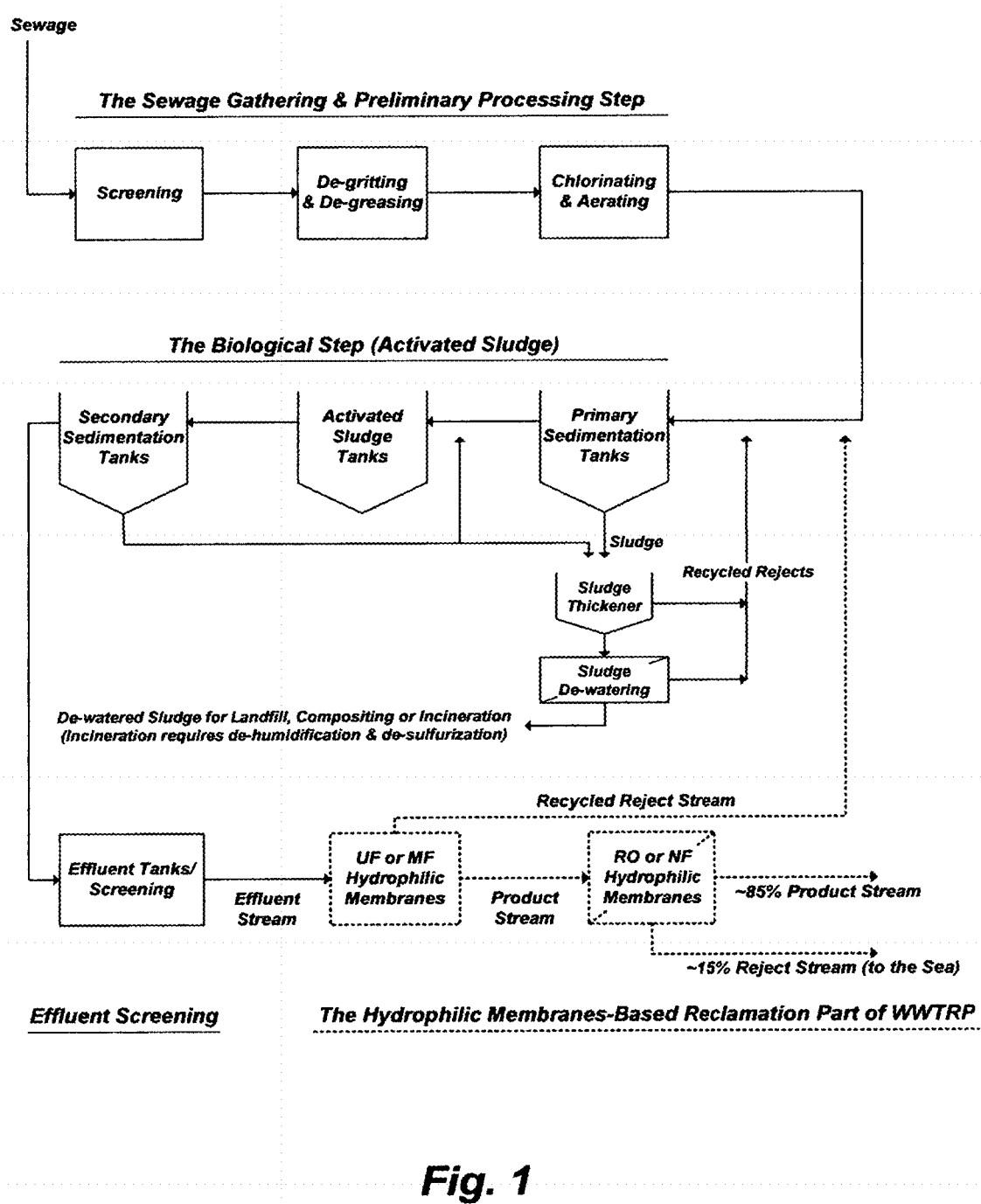
FIG. 1 illustrates a possible flow diagram for a WWTRP.

Steam Injection for Viscous Oil Recovery from a Subsurface Formation

Fired heaters such as OTSGs typically generate wet steam with about 80% quality for viscous oil recovery. However, other levels of steam quality may also be selected anywhere below 80% and as low as 20%. In some types of heavy oil recovery such as the intermittent Cyclic Steam Stimulation (CSS) followed by continuous wet steam flooding and/or hot water, the entire steam from OTSGs is injected into a reservoir. CSS is typically applied when oil deposits are at depths much greater than 400 meters. The generated steam from OTSGs in such applications is typically subjected to multiple thermal degradations and letdowns depending on the fracture pressure of a reservoir (e.g., typically far less than 100 bar within the applicable depth for steam injection), the depth of oil deposits, and the travel distance of wet stream from OTSGs to injection wells. In other types of heavy oil recovery such as the Steam Assisted Gravity Drainage (SAGD), wet steam from OTSGs is flashed in a single-stage or multi-stage steam separator(s) to essentially generate 100% dry saturated steam and letdown wet steam. SAGD is typically practiced when oil deposits are at depths of about 100 to 400 meters. Depending on the reservoir's characteristics, the depth of oil deposits and oil viscosity, either type of the flashed steam or both may be used for viscous and heavy oil recovery. As such, the waste thermal generation from both types of viscous and heavy oil recovery lends itself for optimum utilities, wherefore a thermally-driven desalination system can make use of it.

The simplified first cyclic steam pilot design that extended from 1982 to 1986 [SPE 15733, 1987] and the followed second steam pilot [SPE 17987, 1989] for the described oil reservoir in Paragraph [0004] preliminary concluded that oil can be extracted by reducing its viscosity by over 10-fold at a temperature of about 150° C. Lower viscosity and higher saturation oil has been accumulated at a low temperature and pressure due to an overall very shallow depth. The depth gradient of the reservoir trends from the shallower southwest side of the reservoir (a depth of about 75 meters) toward the slightly deeper north east side (a depth of about 244 meters). Formation water overlies the oil bearing deposits and the salinity gradient trends with depth from nearly fresh to brackish water at the shallowest depth to a higher salinity (about seawater level and above) toward the deeper side of the reservoir (Table 2). In these two pilots, steam was generated at about 37.9 bar (below the formation fracture pressure), and injected at a depth of about 128 meters and at pressures within the well head pressures (about 27-30 bar). This suggests that the generation of 80% quality steam at a pressure of about 130 bar and a temperature of about 330° C. from OTSGs in Phase IA and beyond will be thermally degraded through the travel distance from the OTSGs to wells and/or by the requirement of not exceeding the formation fracture pressure (37.9 bar). By not wasting such thermal energy, but rather using it in an effective thermal absorbing desalination system without discounting the required amount of steam, the entire WWTRP's RO reject stream can be treated (as well as produced water, rejects streams from the T-WWTRP, and/or combinations thereof), the load factor of OTSGs may also be improved, and so the economic and environmental positions are assisted (e.g., U.S. patent application Ser. No. 16/873,308).

Here, it is worth noting the following statements. "The pilot project was initiated with simplest design and was handled with in-house expertise with minimum input from outside consultants, . . . " [SPE 15733, pg. 361]. "Production of heavy oil in a place where high quality oil is abundantly available naturally takes a lower priority. However keeping the future requirements in view a modest start . . . " [SPE 17987; pg. 623]. These statements indicated that emphasis was placed on strategic planning rooted in an underlying economic objective. The means in both pilots started from both ends (between about 1,250 BPD and less of ground water or brackish water that essentially came from same formation water that overlies the oil deposit, and an OTSG operated below the fracture pressure of the oil reservoir) to converge in the middle, which was like building an economic bridge. Instead of being driven by consultants, they shaped their pilots to suit their future purposes and produced about 223,000 barrels of oil from 4 wells while they were at it. Now, by contrast, both ends critically diverge, and their high costs and environmental burdens are determinants. Exponential spending, when it can be clearly avoided, attracts others into the fray. Some consultants may try to unrealistically justify it, yet some may gravitate toward it. Nonetheless, nearly half of this sandstone reservoir may not be subjected to steam injection due to a shallow depth and a thin shale cap. Does the shallow part of this oil reservoir need destruction in order to extract oil?

One recent suggestion is mining the very shallow part of the reservoir to presumably avoid the risk of fracturing the thin shale cap by continuous steam flooding, even though steam injection in Phase IA in the deeper part of the reservoir has not been started in a full scale. This will entail draining the shallow low salinity groundwater and brackish water (e.g., Table 2) before excavating the overburden; even though oil deposits is viscous (not even heavy) liquid associated with some gas; not solid bitumen. This will also entail diverting the drained water for dust suppression, re-injection in disposal wells, irrigation or evaporation in open pits. Yet, this water that ought to be drained in order excavate the shallow part of the reservoir is essentially the same water that was used in both pilots to generate steam [SPE 15733; SPE 17987]. If such water can be entirely drained and wasted to suppress dust, it should instead be treated to generate steam (as simplified in the preceding pilots), wet steam, hot water, alkaline water, among other utilities, for the entire reservoir without building the T-WWTRP and without entertaining the idea of mining the shallow part of the reservoir. Yet; does the shallow part of the oil reservoir need external surfactants to extract oil that naturally contains a high total acid number (TAN)?

Figure 2:
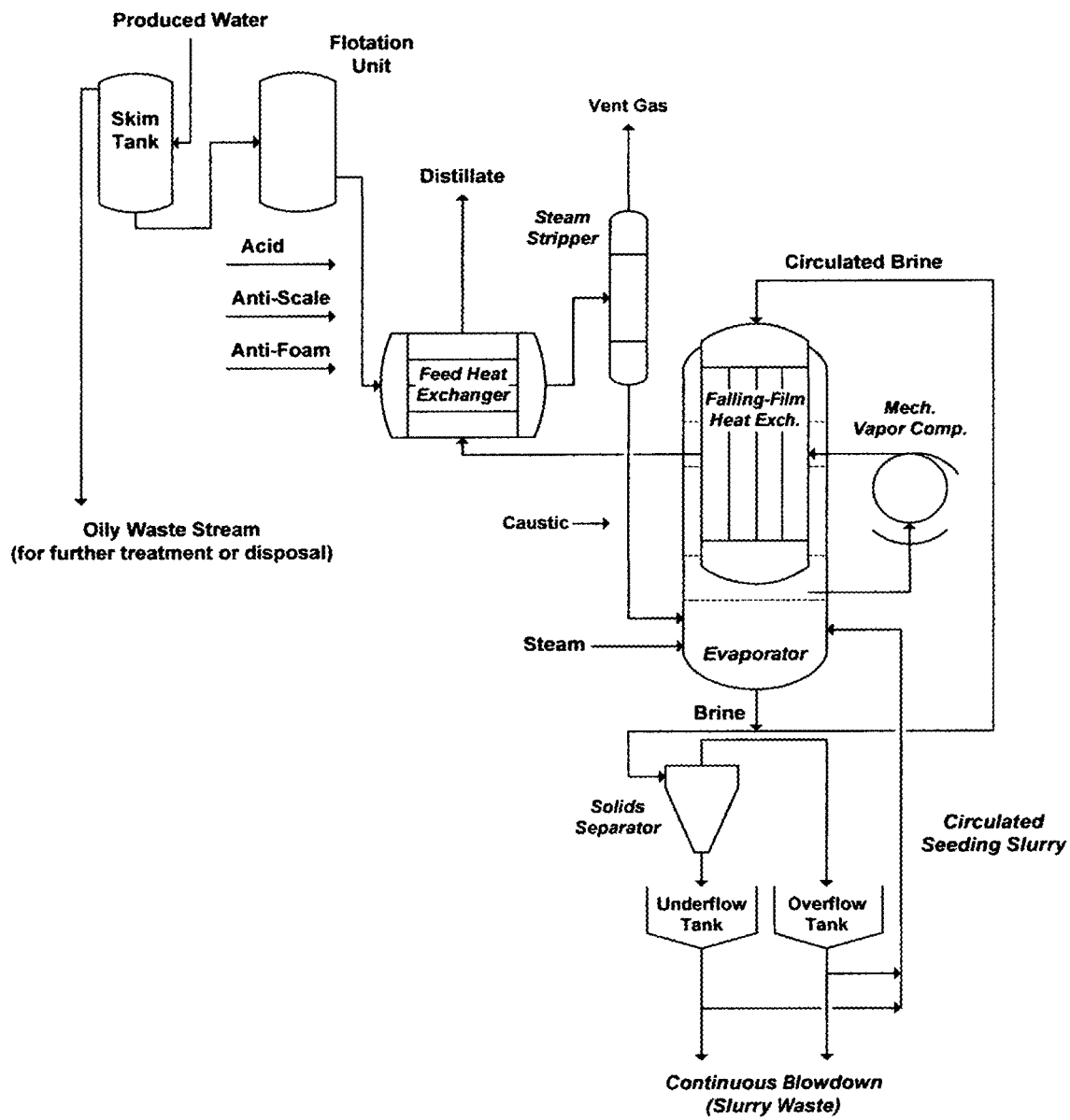
FIG. 2 illustrates a possible flow diagram or a vapor-recompression system (MVR) to treat produced water.
Figure 3A:
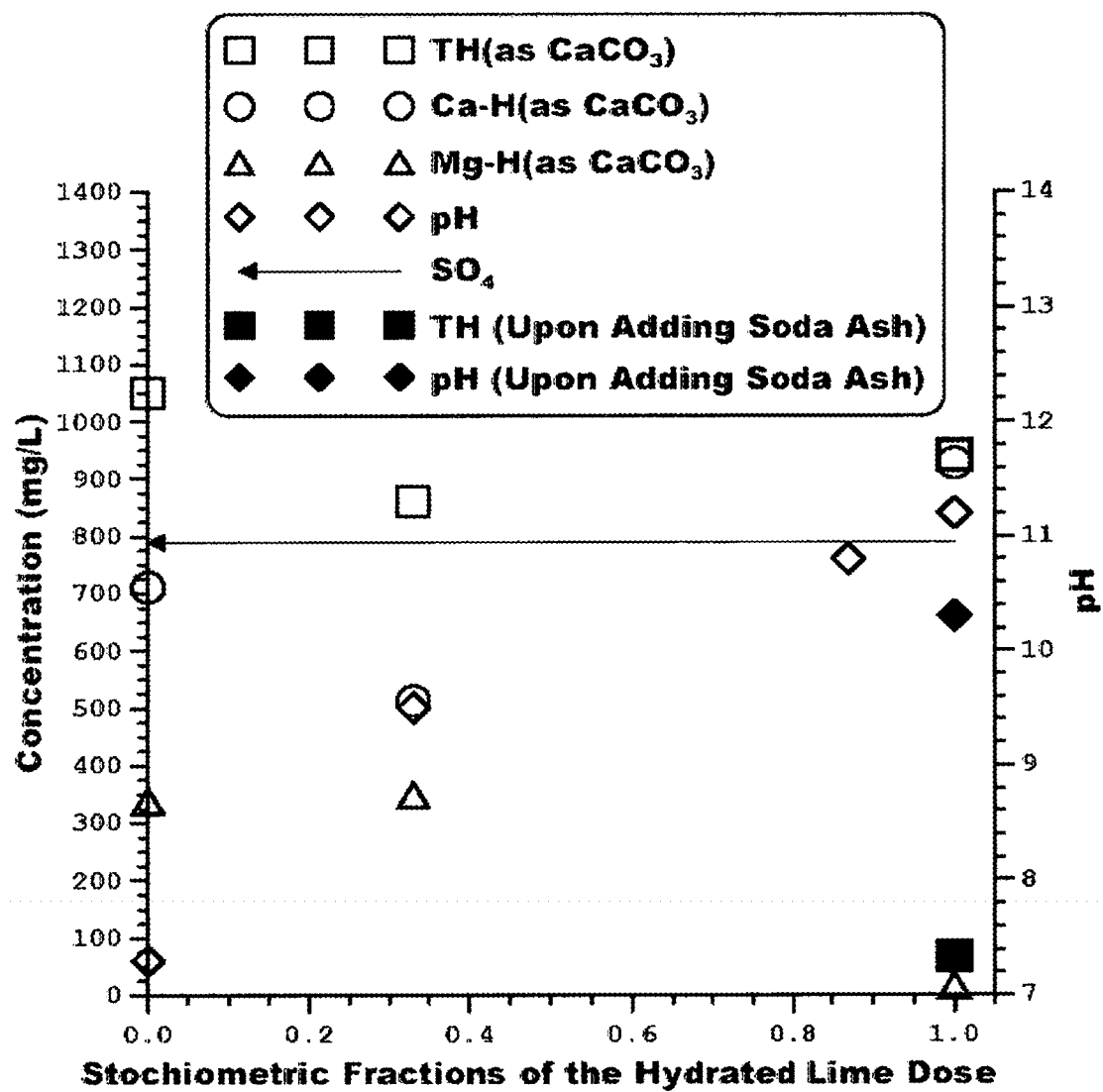
FIG. 3A illustrates the testing of a WWTRP's RO reject stream by hydrated lime and soda ash.
Figure 3B:
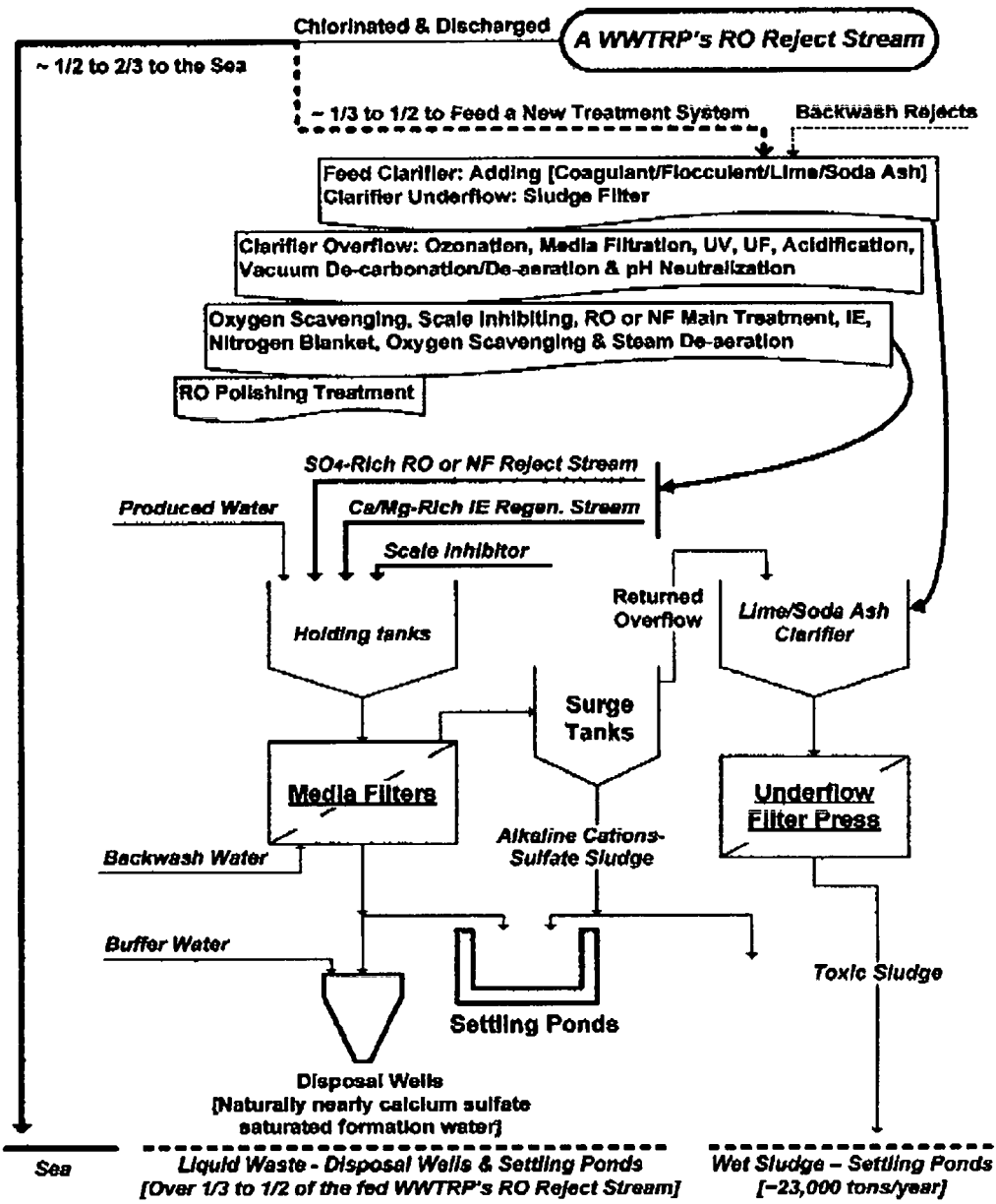
FIG. 3B illustrates the expansion of waste generation paths.
Figure 4:
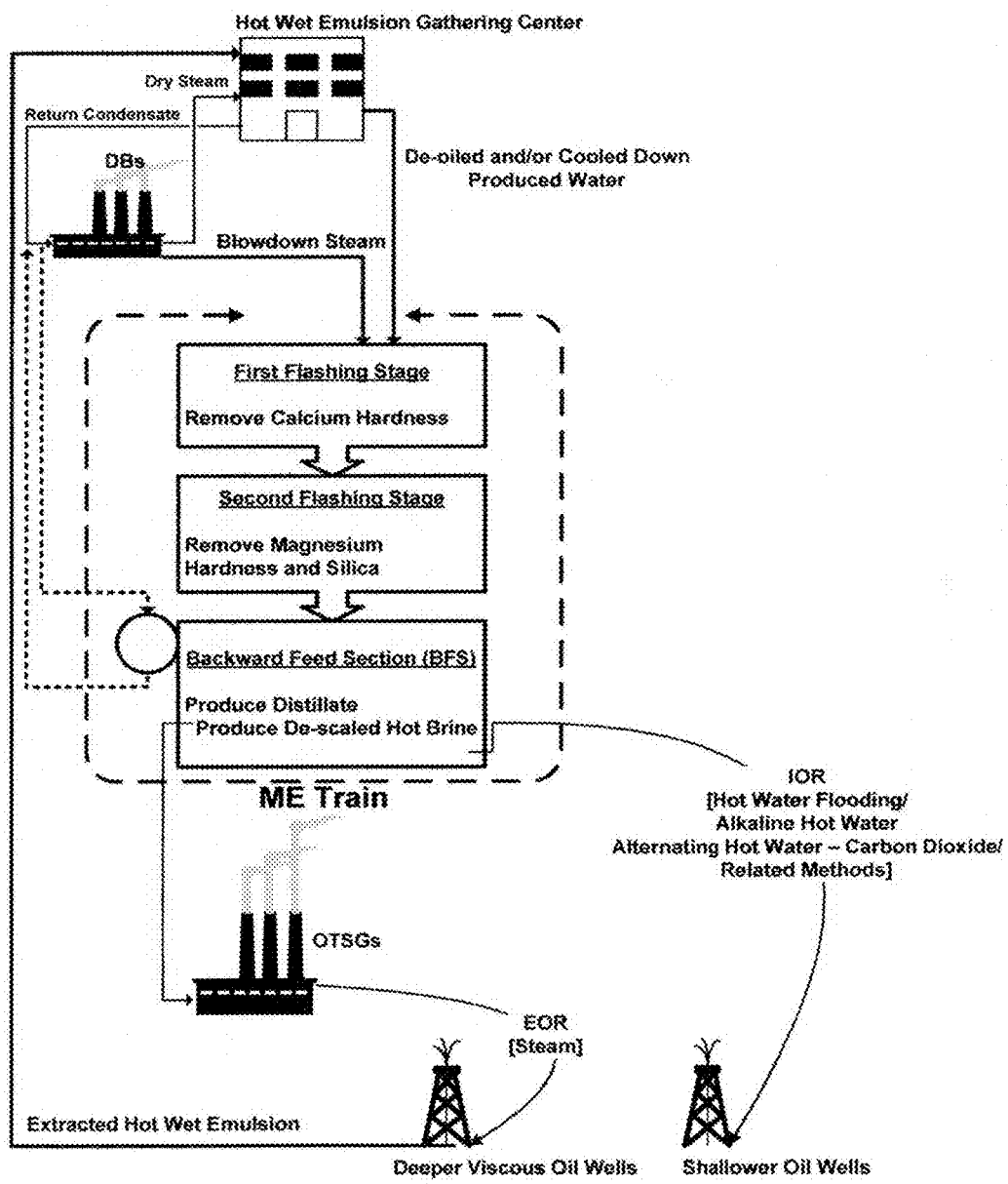
FIG. 4 illustrates an overall summary for one of the embodiments of this invention.

The waste thermal generation of OTSGs can be, of course, routed to the inlet of a MVR system (e.g., through the evaporator body and/or the heat exchanger for recycling as may be shown in FIG. 2). But it must be degraded further since the MVR system essentially operates at about atmospheric pressure. Yet, it will not reduce the intensive power requirement for the vapor compressor as pointed out specifically in Paragraph [0026] of this invention and thoroughly in U.S. Pat. No. 10,577,269 regardless of the nature of source water, even if any type of scaling issues, as also pointed in U.S. Pat. No. 10,441,898, is resolved.

In U.S. patent application Ser. No. 16/873,308, the waste thermal generation of OTSGs is rather routed to a brine heater of a single recycle-brine multi-stage flash desalination (RB-MSF) train, without a heat rejection section, and with the aid of two de-toxifying and/or de-scaling stages, to treat the entire WWTRP's RO reject stream and the like. By integrating the brine heater as a "heating condenser", the RB-MSF train can be part of the OTSGs steam generation cycle with a modification, wherein at least the train does not require the use of fuel at its full cost. By eliminating the heat rejection section, the requirement for cooling water and an external condenser is also eliminated. By adding the de-toxifying and/or de-scaling stages, the conventionally imposed restrictions on the performance ratio, circulation ratio, and concentration ratio are all also lifted. An ultimate design freedom is thus obtained to select the desired amounts of distillate and de-scaled reject brine of the RB-MSF train, where both streams are much needed in enhanced (e.g., steam requires distillate) and improved (e.g., water or hot water flooding and its related methods require de-scaled brine) oil recovery. But above all, yet once and for all, the treatment of the WWTRP's RO reject stream in its entirety, for example, can be achieved in cost effective and environmentally sound manners.

Figure 5:
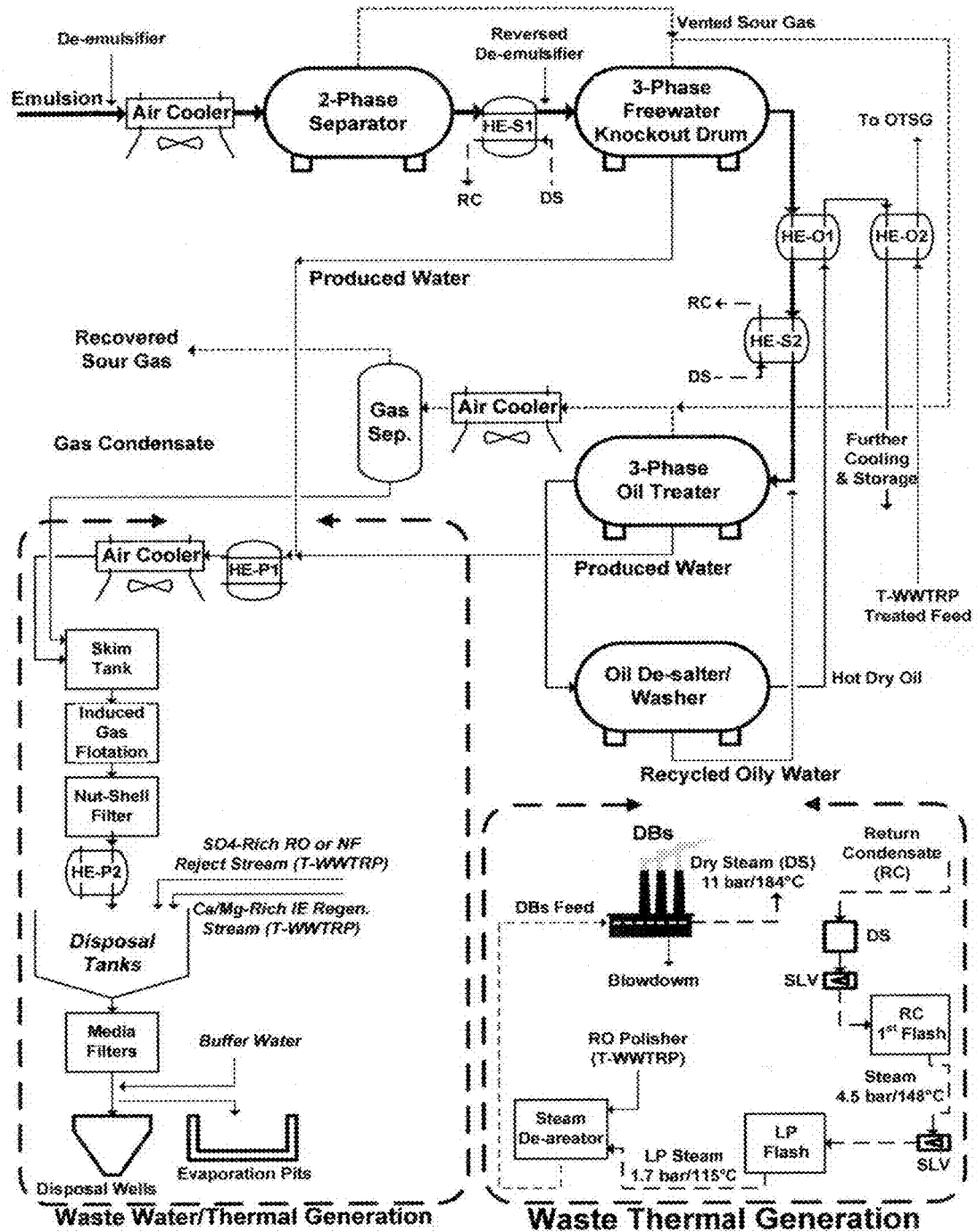
FIG. 5 may illustrate a possible flow diagram for a hot wet emulsion gathering center.

More Steam to Separate "the Extracted Hot Wet Emulsion by Steam" into Oil and Water FIG. 5 may possibly reflect the treatment of the extracted hot wet emulsion by steam injection at a surface facility. Here again, triplicate forms are also pronounced in the treatment system of the extracted hot wet emulsion (which is, in a way, similar to the triplicate forms of treatment in the T-WWTRP to prepare a portion of the WWTRP's RO reject stream for OTSGs). It comprises, for example, three forms of gas-liquid separators, three pairs of heat exchangers, at least three trim coolers (air coolers), three forms of produced water de-oiling equipment, at least three forms of steam degradation for both return condensate of the dry steam and the blowdown steam from the drum-type boilers (DBs), etc. Of interest here; however, is the thermal degradation of: (1) the vented, hot, and combined oily produced water from the free-water knockout drum and the oil treater by two heat exchangers (HE-P1 and HE-P2) and one trim cooler; and (2) the return condensate of the DBs' dry steam after passing through two heat exchangers (HE-S1 and HE-S2) as well as the DBs' blowdown steam.

Such produced water from the free-water knockout drum and the oil treater may be cooled to about 80° C. by a heat exchanger (HE-P1) and/or a trim cooler before de-oiling by: (1) a skim tank; (2) an induced gas flotation unit; and (3) a nutshell filter. The de-oiled produced water may be collected in de-oiled produced water tanks and then cooled further by another heat exchanger (HE-P2) before flowing to disposal tanks; wherein it is mixed with the sulfate-rich NF or RO reject stream and the IE calcium/magnesium-rich brine stream from the T-WWTRP for disposal in aquifer waters.

DBs produce about 97% dry (saturated) steam at about 11 bar and 184° C. This dry steam may pass through two dry steam-driven heat exchangers (HE-S1 and HE-S2). The return condensate from these two heat exchangers is then thermally degraded in a series of de-superheaters (DS), steam let down valves (SLV), a first flash drum at about 4.5 bar and 148° C., and a low-pressure (LP) flash drum at about 1.7 bar and 115° C., before dumping the latter in a LP steam-driven de-aerator to de-oxygenate the DBs' feed stream (which is a portion of the product stream resulting from the RO polishing unit of the T-WWTRP) and to suddenly raise the temperature of this feed stream from ambient temperature to about 110° C. before it is fed to the DBs. Of the energy required to produce dry steam by DBs: (1) less than 15% may be used to re-heat (e.g., FIG. 5) the already hot wet emulsion between the 2-phase separator and the free-water knockout drum by the first dry steam heat exchanger (HE-S1) as well as between the free-water knockout drum and the oil treater by the second dry steam heat exchanger (HE-S2); if required since the extracted wet emulsion is already regeneratively heated by steam injection and the expected temperature may be within 120° C. in normal operation; (2) more than 15% may be used to directly heat the DBs' feed in the LP steam-driven de-aerator by LP return condensate (from ambient temperature to about 110° C.); and (3) anywhere in between the dry steam heat exchangers and the LP steam-driven de-aerator, steam is thermally degraded in a series of heat rejection devices and steam headers. That may be to essentially say that the useful majority of the produced dry steam by DBs is used to directly heat the DBs' own feed; thereby accepting the loss in thermal efficiency that this entails, which is a very considerable thermodynamic irreversibility.

DBs also produce about 3% as blowdown steam, which is also thermally degraded in a series of flash drums. Flashed steam from a first blowndown flash drum may be jointed with the degraded return condensate by de-superheating and/or letting down valves at about 4.5 bar and 148° C., whereas the condensate from the first flash drum may be passed to a second blowndown flash drum. Flashed steam in the second blowndown flash drum may be vented to atmosphere, and the condensate may be jointed with the de-oiled produced water before the latter enters the second produced water heat exchanger (HE-P2).

The Waste "Water/Thermal" Generation—Produced Water

Table 2 presents the predicted content of produced water by the SOLMINEQ program. Produced water is enriched with total hardness and total alkalinity, but depleted of sulfate. The moderately alkaline pH of produced water is amenable for silica to remain soluble. This prediction is approximate, but it is consistent with subjecting the reservoir's formation to steam, since the formation largely comprises two separate sets of sand layers cemented with calcite, dolomite and clays. Based on the steam to oil ratio, the anticipated amount of produced water in Phase IA and Phase IB may be in the order of 100,000 BPD and 220,000 BPD, respectively. Calcium in such produced water will supersaturate the already nearly saturated aquifer water with calcium sulfate, which will lead to precipitate a huge mass of calcium sulfate at downhole temperature; thereby plugging the permeable zone of disposal wells. Silica in such produced water may build up very tenacious scale in downstream equipment and piping associated with disposal wells. A MVR system to treat such produced water will require excessive power for the compressor alone.

The predicted bicarbonate concentration in the produced water (Table 2) is about 3-fold higher than that in the WWTRP's RO reject stream (Table 1). Calcium concentration in such produced water is about twice bicarbonate concentration but about 40% of magnesium concentration (expressed in meq./L). As already pointed out, the vented and combined hot produced water from the free-water knockout drum and the oil treater (FIG. 5) may be at a temperature in the order of at least 80° C. This hot produced water is thermally degraded by a series of heat exchangers to about ambient temperature before flowing to disposal tanks.

Utilization of the Waste "Water/Thermal" Generation

Steam is the most expensive item to product in any system. As such, every opportunity to lower its consumption and/or improve its utilization should be explored; including utilizing already regeneratively heated streams; regenerative evaporating of heated streams, regenerative heating of feed streams, and/or combinations thereof. In this invention, the waste "water/thermal" generation (de-oiled and/or cooled down produced water as well as the return condensate of the dry steam and the blown down steam from the DBs) is innovatively effectively utilized. De-oiled and/or cooled down produced water is directly contacted with the blowdown steam of the DBs to be vented, pre-heated and effectively de-scaled. It is then routed to a last effect of a single multi-effect distillation (ME) train comprises a backward feed section (BFS), without feed pre-heaters and hot distillate flashing chambers, and with thermal energy provided to the first effect of by the return condensate of the dry steam from the DBs. By integrating the heat transfer surface of the first effect as a "heating condenser", this ME train can be part of the DBs steam generation cycle with a modification; wherein the ME train utilizes the valuable thermal energy with the DBs' return condensate that otherwise is wasted in the de-superheaters, steam letdown valves and steam flash drums, yet without affecting the required LP steam for the steam-driven de-aerator (FIG. 5). By eliminating feed pre-heaters and hot distillate flashing chambers (also refer to as flashing boxes, flashing pots, etc.) in the ME train, only one form of heat transfer surface is required and the required thermal energy, after the first effect, is provided by increasing the heat transfer surface in each effect, thereby applying one of the most thermodynamically regenerative approach (regeneratively heating feed streams) by essentially true boiling. By adding the heat rejection condenser to condense the vapor from a last effect of the ME train with cooling water; the treated OTSGs' feed stream by the T-WWTRP can be used as cooling water; thereby, in turn, desirably pre-heating the OTSGs' feed stream. By conducting de-scaling within the two flashing stages prior to applying the ME train comprising BFS, the underlying engineering prohibition on the backward feed mode (maximize scale formation and reject brine at the highest temperature) as well as the conventional imposed restrictions (stay comfortably below the region of scale formation) on the performance ratio, circulation ratio, and concentration ratio of the ME train are all also lifted. Again, an ultimate design freedom is thus obtained to select the desired amounts of distillate and de-scaled hot reject brine of the ME train, where both streams are much needed in enhanced (e.g., steam requires distillate) and improved (e.g., hot water flooding and its related methods require de-scaled hot brine) hydrocarbons recovery (including oil). Here, too, again, above all and yet once and for all, the treatment of produced water in its entirety, for example, can be achieved in cost effective and environmentally sound manners.

De-Oiling and/or De-Scaling of Cooled Down Produced Water

Figure 6A:
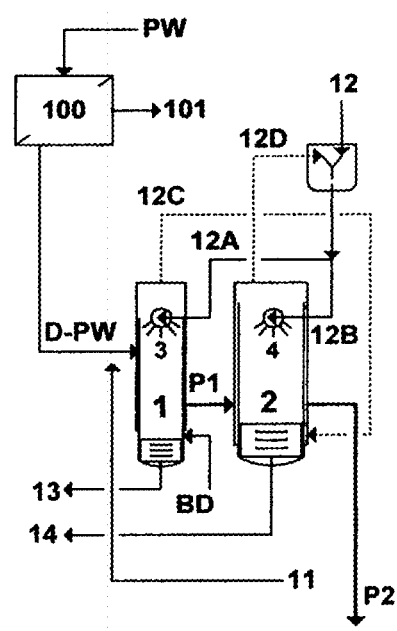
FIG. 6A illustrates a possible flow diagram for the inventive standalone flashing stages.

FIG. 6A shows the two key flashing stages to de-scale the de-oiled and/or cooled down produced water. An example of such de-oiled and cooled down produced water is the transferred produced water to disposal tanks as may be depicted in FIG. 5, or the transferred produced water to the produced water tanks (not shown in FIG. 5) prior to the second produced water heat exchanger [HE-P2] and disposal tanks. The essential function of the first modified flashing stage [1] is to remove calcium hardness, whereas the essential function of the second flashing stage [2] is to remove magnesium hardness and silica. The de-oiled and cooled down produced water [D-PW] is mixed with an aluminum source [11] and then introduced to the first flashing stage [1], wherein it is directly contacted with the blowdown steam [BD] of the drum-type boilers (DBs). A first portion [12A] of an organic hydroxide source [12] is sprayed via a first nozzle [3] into the first flashing stage [1]; thereby vigorously forming a first precipitate comprising calcium carboaluminate [13], simultaneously recovering [12C] the first portion [12A] of the organic hydroxide source [12], and producing first pre-heated brine [P1]. Here, rather than essentially wasting the considerable thermal energy within the blowndown steam [BD] resulting from the DBs in heat rejection devices, it is entirely directly utilized in the first flashing stage [1], to pre-heat the de-oiled and cooled down produced water. Here, too, rather than allowing carbon dioxide to evolve, it is suppressed by the organic hydroxide source; thereby very readily forming the precipitate comprising calcium carboaluminate (effectively removing calcium hardness and alkalinity). The aluminum source is selected from the group consisting of aluminum hydroxide, sodium aluminate, aluminum chloride, and/or combinations thereof. Other aluminum based sources may also be used. The heat source is selected from the group consisting of blowdown steam, return condensate, letdown steam, steam from a heat rejection device, and/or combinations thereof. The organic hydroxide source is selected from the group consisting of isopropylamine, propylamine, dipropylamine, diisopropylamine, ethylamine, diethylamine, methylamine, dimethylamine, ammonia, and/or combinations thereof.

The first pre-heated brine [P1] from the first flashing stage [1], which still essentially contains magnesium hardness and silica, is then released along with the recovered first portion [12C] of the organic hydroxide source in the second flashing stage [2] to be contacted with a second portion [12B] of the organic hydroxide source [12], wherein the second portion [12B] of the organic hydroxide source is sprayed via a second nozzle [4] into the second flashing stage [2], thereby vigorously forming a second precipitate comprising magnesium hydroxide, magnesium silicates and magnesium silicoaluminate [14], simultaneously recovering the organic hydroxide source [12D], and producing de-scaled pre-heated brine [P2]. Here, the pH in the second flashing stage [2] is maintained at a higher level than the pH in the first flashing stage [1] to essentially not allow the precipitation of magnesium hydroxide in the first flashing stage [1]. This is because the purpose of these two flashing stages ([1] and [2]) is not just generating waste, but rather to selectively form useful precipitates as by-product minerals; otherwise these two flashing stages can be combined in a single flashing stage. The formed magnesium hydroxide in the second flashing stage [2] from the first pre- and heated brine [P1] upon spraying the second portion [12B] of the organic hydroxide source [12] is, in turn, utilized to remove silica as well as to enhance the recovery of the organic hydroxide source [12D]. Any carried over aluminum source with the first pre-heated brine [P1] is utilized in forming magnesium silicoaluminate; thereby enhancing the removal of silica in the second flashing stage [2].

Figure 6B:
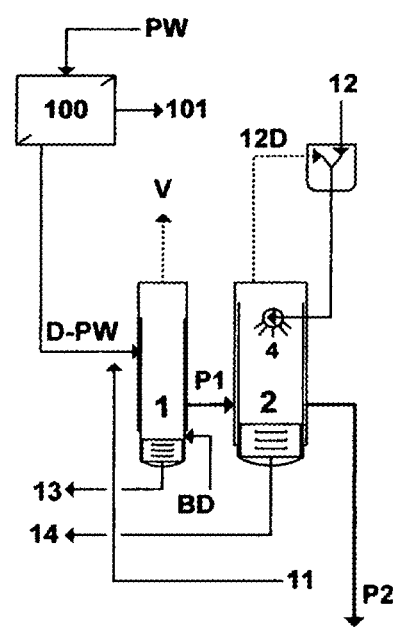
FIG. 6B illustrates another possible flow diagram for the inventive standalone flashing stages.

FIG. 6B depicts another variant for conducting the two key flashing stages. The de-oiled and/or cooled down produced water [D-PW] is mixed with the aluminum source [11] and then introduced to the first flashing stage [1], wherein it is directly contacted with the blowdown steam [BD] of the drum-type boilers (DBs), thereby vigorously venting carbon dioxide [V], forming a first precipitate comprising calcium carbonate, calcium aluminate and calcium silicoaluminate [13], and producing the first pre-heated brine [P1]. Here, when the de-oiled and cooled down produced [D-PW] enters the free space of the first flashing stage [1] at a reduced pressure, carbon dioxide vigorously evolves from bicarbonate breakdown, thereby increasing the pH and the forming carbonate ions precipitate as essentially calcium carbonate. The first pre-heated brine [P1] from the first flashing stage [1] is then released in the second flashing stage [2] to be contacted with the organic hydroxide source [12], wherein the organic hydroxide source [12] is sprayed via the second nozzle [4] into the second flashing stage [2], thereby vigorously forming the second precipitate comprising magnesium hydroxide, magnesium silicates and magnesium silicoaluminate [14], simultaneously recovering the organic hydroxide source [12D], and producing the de-scaled pre-heated brine [P2].

Iron ($Fe^{+3}$) based sources (iron hydroxide, sodium ferrite, and/or iron chloride) can also be used instead of the aluminum based sources to form a precipitate comprising calcium carboferrate and calcium ferrate in the first flashing stage [1] and magnesium silicoferrate in the second flashing stage [2].

It should be noted here that a caustic source such as sodium hydroxide, potassium hydroxide and the like can be used instead of the organic hydroxide source but their main drawbacks are that the pH must be adjusted twice and such caustic sources are not recoverable. Sodium carbonate, potassium carbonate and the like can also be used instead of the organic hydroxide source but their main drawbacks are that they add more alkalinity (carbonate) to the de-oiled and cooled down produced water [D-PW] and are not recoverable. On the other hand, the use of the recoverable organic hydroxide source in this invention eliminates all of such drawbacks.

A likely reason for thermally degrading the vented and combined hot produced water from the free-water knockout drum and the oil treater to about 80° C. by a series of heat exchangers before de-oiling by also a series of conventional methods (a skim tank, an induced gas flotation and a nutshell filter as may be depicted in FIG. 5) may be to prevent such produced water from flashing in the skim tank (the first conventional de-oiling step). Such produced water resulting from the free-water knockout drum and the oil treater can be directly effectively de-oiled by hydrophobic membranes as has been taught by this inventor in multiple patents [e.g., U.S. Pat. Nos. 6,365,051; 7,789,159; 7,934,551; 7,963,338; 8,915,301; 9,701,558; and 10,441,898]. However, if required, hot produced water from free-water knockout drum and the oil treater, or cooled down produced water [PW] is directly de-oiled by hydrophobic membranes [100] to effectively recover oil [101] and provide the de-oiled produced water [D-PW]. This single step (hydrophobic membranes [100]) can substitute any or the entire set of conventional de-oiling steps as may be depicted in FIG. 5.

A Multi-Effect Distillation (ME) Train Comprising a Backward Feed Section (BFS)

Figure 6C:
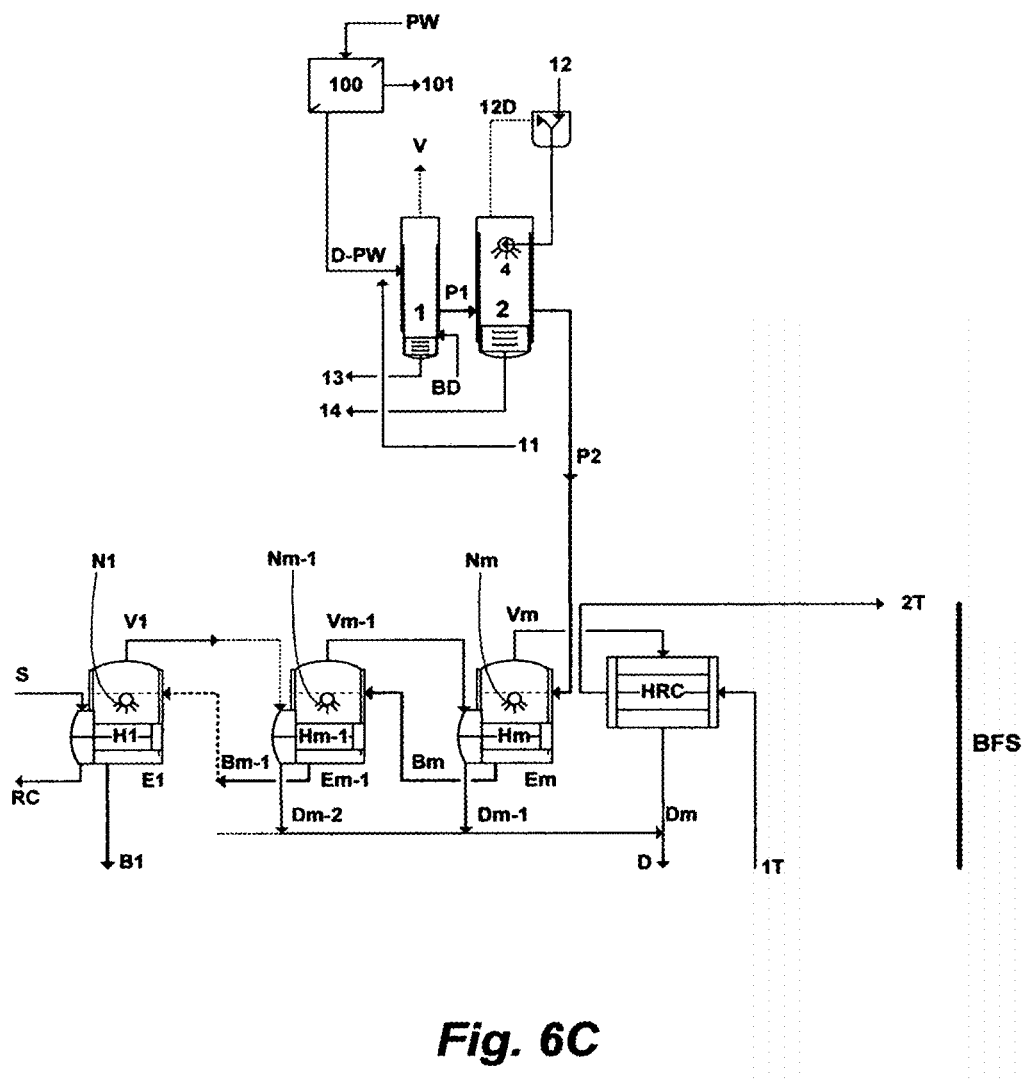
FIG. 6C illustrates a possible for the inventive ME train comprising a FFS.

The de-scaled pre-heated brine [P2], which essentially comprises sodium chloride, since it is depleted of calcium hardness, magnesium hardness and silica, can be used as a readily pre-heated feed stream for the multi-effect distillation (ME) train comprising a backward feed section (BFS) as shown in FIG. 6C. As such, the most thermodynamically regenerative approach becomes applicable to the ME train since the readily pre-heated feed stream [P2] flows to the lowest temperature effect, and after partial evaporation, its concentrate cascades as feed to each higher temperature effect in turn; thereby the energy extracted to heat the feed is only slightly warmer than the feed it is heating. Neither external feed pre-heaters nor flashing chambers (also refer to as flashing boxes, flashing pots, etc.) are utilized; only one form of heat transfer surface is required, and the required thermal energy is provided by increasing the heat transfer surface in each effect. Vapor is produced in this ME train by essentially true boiling. The structural simplicity of this ME train is comparable to the structural simplicity of a multi-stage flash desalination (MSF) train. The point to be emphasized here is that this simplicity is the heart of the process.

FIG. 6C depicts this ME train in conjunction with the two flashing stages as described above and shown in FIG. 6B (the ME train can also be used in conjunction with the two flashing stages as shown in FIG. 6A and described above). The BFS of the ME train comprises a plurality of effects [E1 to Em] arranged in series. E1 is the first effect and operated at the highest temperature, Em is the last effect and operated at the lowest temperature, and Em−1 is the preceding effect of the last effect [Em]. For simplicity, FIG. 6C shows only these three effects [E1, . . . , Em−1, and Em] in the BFS since the remainder effects duplicate in function the effects shown, and the connections among these effects [E1 to Em] are indicated in FIG. 6C by dotted lines. Each effect has it is own evaporating surface [H1, . . . , Hm−1, and Hm], spray nozzles [N1, . . . , Nm−1, and Nm], a vapor stream [V1, . . . , Vm−1, and Vm], a condensed vapor stream (distillate) [ . . . , Dm−2, Dm−1, and Dm], and a brine stream [B1, . . . , Bm−1, and Bm].

As shown in FIG. 6C, the feed stream to the BFS [P2] (the de-scaled pre-heated brine [P2] from the second flashing stage [2]) flows and sprays via the nozzles [Nm] on the outer surface of evaporating tubes [Hm] of the last effect [Em] of the BFS; wherein the last effect [Em] is operated at the lowest temperature and pressure, to produce a vapor stream [Vm] and a brine stream [Bm]. The brine stream [Bm] from the last effect [Em] of the BFS flows backward to the subsequent effect [Em−1] and then sprays via nozzles [Nm−1] on the outer surface of evaporating tubes [Hm−1] to produce a vapor stream [Vm−1] and a brine stream [Bm−1]. The brine stream [Bm−1] then flows in similar manner to the subsequent effect. As brine flows backward from effect to effect, it is elevated in both temperature and TDS until it is discharged from the first effect [E1] at the highest temperature and TDS as a final brine stream [B1] of the BFS.

An external steam source [S] is fed into the inner side of the evaporating tubes [H1] of the first effect [E1] of the BFS. This external steam source [S] may be, for example, at least a portion of the DBs' return condensate after passing the dry steam through from the two steam-driven heat exchangers (HE-S1 and HE-S2) as may be depicted in FIG. 5; otherwise the BDs' return condensate is thermally degraded in a series of de-superheaters, letdown valves and flash drums, before it enters the LP steam-driven de-aerator at 1.7 bar and 115° C. Rather, at least a portion of this return condensate may be effectively used to supply the external steam [S] to the BFS, and then is returned to the DBs' steam cycle without affecting the required LP steam for the LP steam-driven de-aerator (e.g., FIG. 5). A portion of the feed stream of the first effect [E1] in the BFS, which is the brine stream [B2] from the second effect (not shown in FIG. 6C) evaporates, thereby the first effect [E1] produces a vapor stream [V1] and a brine stream, wherein the produced brine stream from the first effect [E1] is the final brine stream [B1] of the BFS.

The produced vapor stream [V1] from the first effect [E1] is fed into the inner side of evaporating tubes of the second effect of the BFS (not shown in FIG. 6C). It condenses after giving up its latent heat to the lesser temperature brine being sprayed on the outer surface of the evaporating tubes of the second effect. Here, spraying via nozzles in each of the effects is accompanied by flashing, thereby boiling (a spray film at the surface of the evaporating tubes) and flashing (spraying through the nozzles near the top of the effect under a reduced pressure) contribute to vapor production (which is after condensation in a next effect becomes distillate) in each effect, wherein boiling is essentially dominant. The condensation of the vapor stream [V1] from the first effect [E1] occurs in the second effect [E2] at a temperature a few degrees lower than that in the first effect [E1] due to the successively lower pressure in each effect in going down the BFS. The condensate of the vapor stream [V1] from the first effect [E1] becomes the distillate stream of the second effect [E2] (not shown in FIG. 6C).

Similarly, the arising vapor from the second effect is fed to the inner side of evaporating tubes of a third effect and so on, thereby condensates (distillate streams) [ . . . , Dm−2, Dm−1] flow from effect to effect (from E1 to Em−1], except the arising vapor [Vm] from the last effect [Em], wherein the vapor [Vm] from the last effect [Em] is condensed [Dm] in the heat rejection condenser [HRC] of the BFS by a water source. This water source [1T] can be, for example, the treated feed stream of the T-WWTRP to feed OTSGs. Here, the heat rejection condenser [HRC] of the BFS also serves as a pre-heater; thereby pre-heating the treated feed stream of the T-WWTRP as it exists [2T] the heat rejection condenser [HRC]. The distillate [Dm] stream from the condensed vapor stream [Vm] from the last effect [Em] is combined with distillate streams [ . . . , Dm−2, and Dm−1] from other effects in a distillate line common to the effects of the BFS as a final distillate stream [D]. The brine stream [B1] from the first effect [E1] is produced, as the final brine stream of the BFS, at the highest temperature and TDS.

A ME Train Comprising a BFS and a Forward Feed Section (FFS)

Figure 6D:
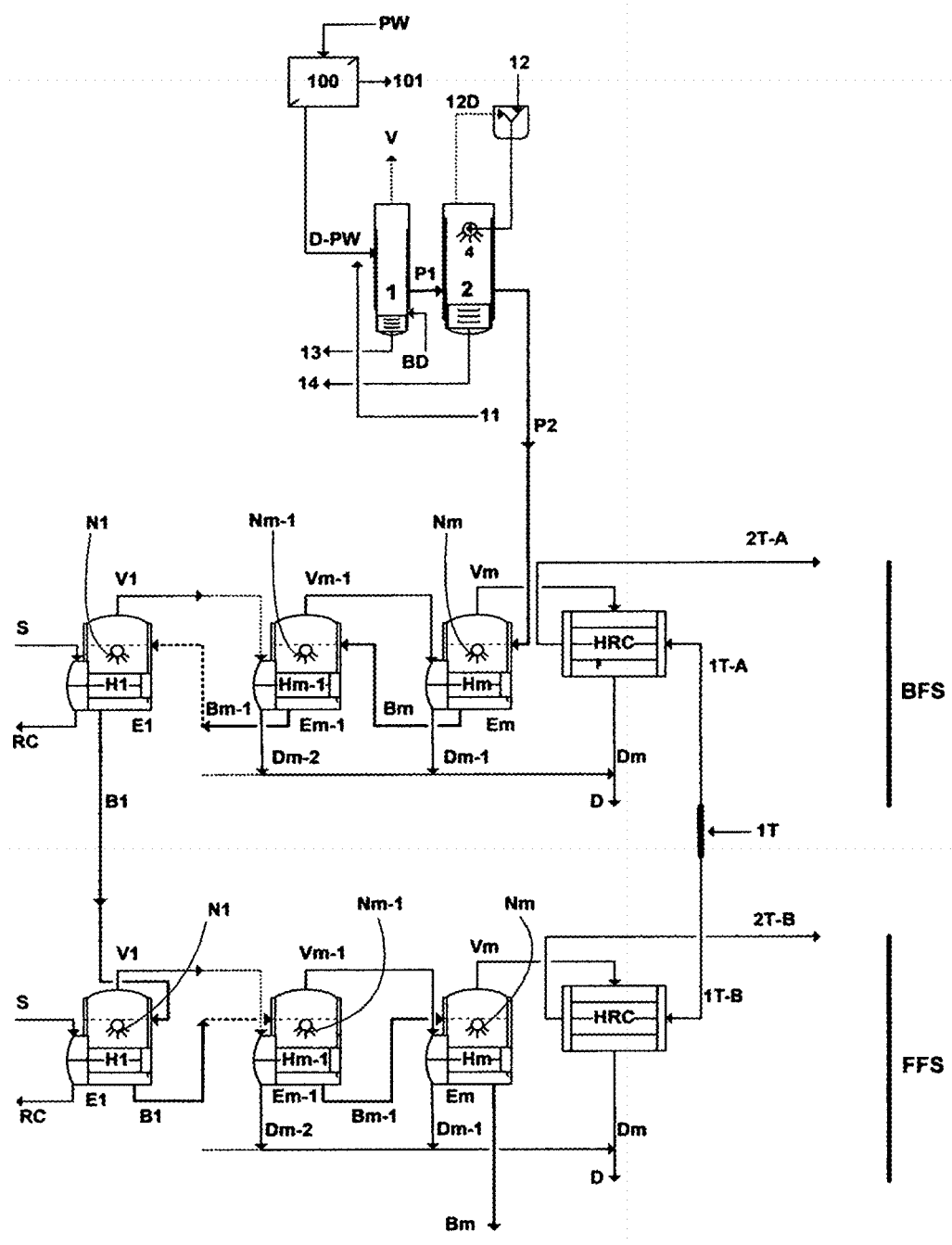
FIG. 6D illustrates a possible flow diagram for the inventive ME train comprising a FFS and a BFS.

However, it may be desirable to increase the amount of distillate (e.g., to feed OTSGs to produce steam for viscous oil recovery or other utilities). This can be achieved as shown in FIG. 6D, wherein the depicted ME train comprises two sections; the BFS followed by a forward feed section (FFS). The BFS is already described above and shown in FIG. 6C, which is the same as also depicted in FIG. 6D, wherein the feed stream (the de-scaled pre-heated brine [P2] from the second modified flashing stage [2]) to be evaporated flows to the last effect [Em] (the lowest temperature and pressure effect) of the BFS and then passes through each subsequent effect in turn in the opposite direction (counter-current) as the produced vapor causing evaporation in each effect. The FFS is similar to the BFS, except that the feed stream (the final brine stream [B1] from the first effect [E1] of the BFS) to be evaporated flows to the first effect [E1] of the FFS (the highest temperature and pressure effect) and then passes through each subsequent effect in turn in the same direction (co-current) as the produced vapor causing evaporation in each effect. It should be noted here, that the labeling in the BFS and FFS as shown FIG. 6D are kept the same (for simplicity).

Here again, the regenerative evaporating of the feed is naturally applied in the FFS, wherein the feed (the final brine stream [B1] from the first effect [E1] of the BFS) flows to the highest temperature effect [E1] of the FFS, and after partial evaporation, its concentrate cascades as feed to each lower temperature effect in turn; thereby the energy extracted to heat the feed is only slightly warmer than the feed it is heating. Also, neither external feed pre-heaters nor flashing chambers are utilized; only one form of heat transfer surface is required, wherein the required thermal energy, after the first effect, is provided by increasing the heat transfer surface in each effect. Vapor is produced in this FFS by essentially true boiling. As such, the structural simplicity of the FFS is maintained similar to the BFS.

As shown in FIG. 6D, the FFS also comprises a plurality of effects [E1 to Em] arranged in series. E1 is the first effect and operated at the highest temperature, Em is the last effect and operated at the lowest temperature, and Em−1 is the preceding effect of the last effect [Em]. For simplicity, FIG. 6D also shows only these three effects [E, . . . , Em−1, and Em] since the remainder effects duplicate in function the effects shown, and the connections among these effects [E1 to Em] are indicated in FIG. 6D by dotted lines. Each effect has it is own evaporating surface [H1, . . . , Hm−1, and Hm], spray nozzles [N1, . . . , Nm−1, and Nm], a vapor stream [V1, . . . , Vm−1, and Vm], a condensed vapor stream (distillate) [ . . . , Dm−2, Dm−1, and Dm], and a brine stream [ . . . , B2, . . . , Bm−1, and Bm].

As shown in FIG. 6D, the feed stream to the FFS (the final brine stream [B1] from the first effect [E1] of the BFS) flows and sprays via the nozzles [N1] on the outer surface of evaporating tubes [H1] of the first effect [E1] of the FFS; wherein the first effect [E1] is operated at the highest temperature and pressure, to produce a vapor stream [V1] and a brine stream [B1]. The brine stream [B1] from the first effect [E1] of the FFS flows to the subsequent effect through the nozzles and sprays on the outer surface of the evaporating tubes (not shown in FIG. 6D). A brine stream then flows in a similar manner to the subsequent effects until the last effect [Em], wherein the brine stream [Bm] is discharged from the FFS at the lowest temperature and highest TDS.

An external steam source [S] is fed into the inner side of the evaporating tubes [H1] of the first effect [E1] of the FFS. This external steam source [S], for example, may also be at least another portion of the DBs' return condensate after passing the dry steam through from the two steam-driven heat exchangers (HE-S1 and HE-S2) as may be depicted in FIG. 5. Here, the DBs' return condensate in this ME train (not shown FIG. 6D), as an external steam source [S] for example, is split between the inner side of the evaporating tubes [H1] of the first effect [E1] of the BFS, and the inner side of the evaporating tubes [H1] of the first effect [E1] of the FFS. Steam [S] is condensed inside the evaporating tubes [H1] of the first effect [E1] of the BFS, and inside the evaporating tubes [H1] of the first effect [E1] of the FFS, and returned to its source (the DBs) as the return condensate [RC] of the BFS and FFS. A portion of the feed stream of the first effect [E1] (which is the final brine stream [B1] from the first effect [E1] of the BFS) evaporates in the first effect [E1] of the FFS to produces a vapor stream [V1] and a brine stream [B1], thereby condensing the external steam [S] inside the evaporating tubes [H1] of the first effect [E1] to be returned to its source (the DBs' steam generation cycle as may be depicted in FIG. 5) as the return condensate [RC] from the FFS.

The produced vapor stream [V1] from the first effect [E1] is fed into the inner side of evaporating tubes of the second effect of the FFS (not shown in FIG. 6D). It condenses after giving up its latent heat to the lesser temperature brine being sprayed on the outer surface of the evaporating tubes of the second effect. Here, spraying via nozzles in each of the effects is accompanied by flashing, thereby boiling (a spray film at the surface of the evaporating tubes) and flashing (spraying through the nozzles near the top of the effect under a reduced pressure) contribute to vapor production (which is after condensation in a next effect becomes distillate) in each effect, wherein boiling is also essentially dominant. The condensation of the vapor stream [V1] from the first effect [E1] occurs in the second effect [E2] at a temperature a few degrees lower than that in the first effect [E1] due to the successively lower pressure in each effect down the FFS. The condensate of the vapor stream [V1] from the first effect [E1] becomes the distillate stream of the second effect [E2] (not shown in FIG. 6D).

Similarly, the produced vapor stream from the second effect is fed to the inner side of evaporating tubes of a third effect and so on, thereby condensates (distillate streams) [ . . . , Dm−2, Dm−1] flow from effect to effect (from E1 to Em−1], except the produced vapor stream [Vm] from the last effect [Em], wherein the vapor stream [Vm] from the last effect [Em] is condensed [Dm] in the heat rejection condenser [HRC] of the FFS by a water source. The water source [1T] can be, for example, the treated feed stream of the T-WWTRP to feed OTSGs. In this ME train that comprises BFS and FFS as shown in FIG. 6D, the water source [1T] s split between the heat rejection condenser [HRC] of the BFS [1T-A] and the heat rejection condenser [HRC] of the FFS [1T-B]; thereby also pre-heating each of the portions as they exist the heat rejection condenser [HRC] of the BFS [2T-A] and the heat rejection condenser [HRC] of the FFS [2T-B]. However, the produced vapor [Vm] from the last effect [Em] of each of the BFS and FFS may be condensed in one heat rejection condenser common to both sections (BFS and FFS; not shown in FIG. 6D). The distillate [Dm] stream of the condensed vapor stream [Vm] from the last effect [Em] is combined with distillate streams [ . . . , Dm-2, Dm-1] from other effects in a distillate line common to the effects of the FFS as a final distillate stream [D] of the FFS (here, the distillate line essentially common to the entire ME train).

The addition of FFS to the BFS in this ME train as shown in FIG. 6D allows doubling the amount of total distillate. By utilizing the thermal energy within the blowdown steam of the DBs and the cooled down produced water in the two flashing stages ([1] and [2]) to produce the de-scaled pre-heated brine [P2] to feed the BFS, the BFS is enabled to reject the de-scaled hot brine stream from the first effect [E1], which is the final brine stream [B1] of the BFS, at the highest temperature. This would be impossible with conventional backward feed ME train. This also, in turn, dramatically simplifies the design of the FFS since feed pre-heaters are no longer a must requirement in the FSS; thereby enabling the FFS to operate directly at a top temperature that would be impossible with conventional forward feed ME train. Yet, the rejected de-scaled brine stream from the FFS (the final brine stream [Bm] from the last effect [Em]) can be used, for example, to improve viscous oil recovery (alone and/or in combinations with carbon dioxide, alkaline, polymer, etc.) from the shallower part of the oil reservoir; the part that is not amenable to steam injection.

Conventionally conducting a backward feed mode has been considered an unsophisticated way of engineering the multi-effect concept because it has the obvious disadvantages of conducting brine evaporation at the highest brine temperature and brine concentration thereby the highest scaling issues, yet rejecting brine at the highest temperature and the thereby highest wasteful thermal energy. In this invention; however, both issues are innovatively resolved. By conducting the flashing stages ([1] and [2]) as shown in FIGS. 6C and 6D, scaling is no longer an issue in conducting the BFS. By utilizing the de-scaled hot brine stream [B1] from the first effect [E1] of the BFS to improve viscous oil recovery in the shallow part of the oil reservoir, regenerative heating of downhole fluids is applied. Yet, by alternatively feeding the de-scaled hot brine stream [B1] from the first effect [E1] of the BFS to the first effect of the FFS, utilization of the already regeneratively heated brine stream [B1] of the BFS is applied.

A RB-ME Train Comprising BFS and FFS

Figure 6E:
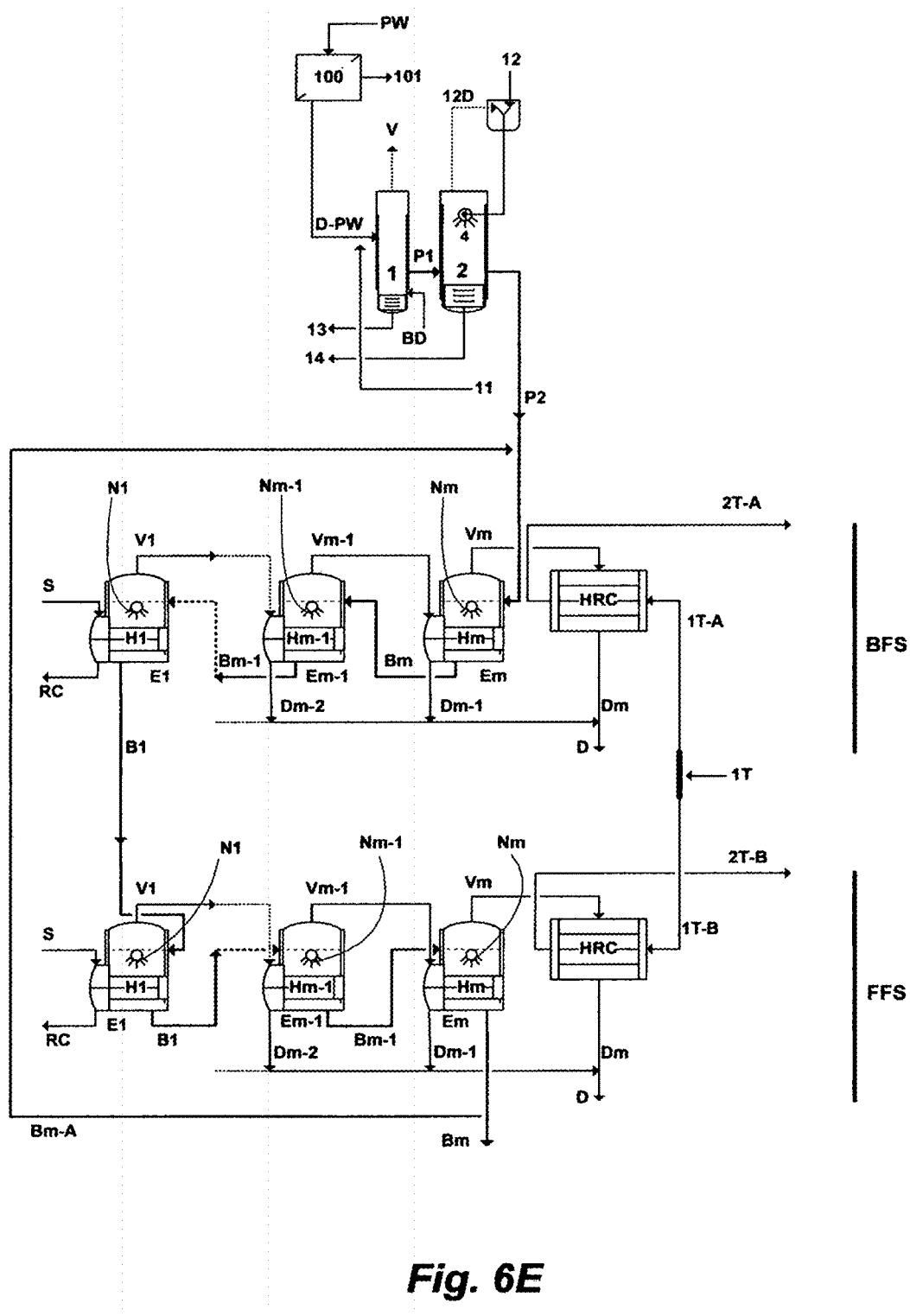
FIG. 6E illustrates a possible flow diagram for the inventive RB-ME train comprising a FFS and a BFS.

FIG. 6E depicts the inventive recycle brine multi-effect distillation (RB-ME) train. The BFS and FFS are the same as shown in FIG. 6D and described above. The only difference is that at least a portion [Bm-A] of the de-scaled brine stream [Bm] from the last effect [Em] of the FFS is recycled to the feed stream (the de-scaled pre-heated brine [P2] from the second flashing stage [2]) of the BFS to form recycle brine prior to entering the last effect of the BFS. This allows increasing further the total distillate of the RB-ME train, and yet still allows using the remaining portion of the de-scaled brine stream [Bm] from the last effect [Em] of the FFS to improve oil recovery (water flooding as its related methods) in the shallow part of the oil reservoir.

TABLE 1

Effluent and RO Reject Streams from a WWTRP.

| Species | ES-A | RORS-A | OTSG-S | RORS-T | RORS-O |
|---|---|---|---|---|---|
| $Na^+$ | 156.3 | 950.9 | | 1,280.0 | |
| $K^+$ | 12.6 | 79.8 | | 84.1 | |
| $Mg^{+2}$ | 11.9 | 76.2 | | 82.2 | |
| $Ca^{+2}$ | 45.0 | 290.8 | | 284.5 | |
| $Fe^{+2}$ | 0.08 | 0.14 | 0.2 | 0.2 | |
| $Cl^-$ | 239.7 | 1,462.2 | | 1735.0 | 2,800.0 |
| $HCO_3^-$ | 97.8 | 416.6 | | 426.4 | 610.0 |
| $SO_4^{-2}$ | 120.3 | 760.1 | | 790.0 | 1990.0 |
| TP | 11.5 | 63.6 | | 17.3 | 41.2 |
| $SiO_2$ | 2.1 | 13.3 | 50 | 11.5 | |
| TSS | | 1.5 | | 1.2 | 1.0 |
| TDS | 690.8 | 4,096.9 | 8,000-12,000 | 4,719.0 | 5,930.0 |
| TH | 161.5 | 1,040.6 | 0.5 | 1,050.0 | 2,660.0 |
| TA | 80.2 | 341.5 | | 350.0 | 500.0 |
| COD | 319.0 | 379.0 | | 345.0 | 114.0 |
| TOC | 0.1 | 0.2 | 5 | 0.2 | 0.0 |
| DO | 6.0 | 6.0 | 0.007-0.02 | 7.0 | 6.0 |
| pH | 6.7 | 7.1 | 8.8-10.5 | 7.3 | 7.1 |

Species: in mg/L;
ES-A: Average Effluent Stream;
RORS-A: Average RO Reject Stream;
OTSG-S: Feed Water Specifications for Once-Through Steam Generators;
RORS-T: Tested RO Reject Stream;
RORS-O: Outlier RO Reject Stream;
TP: Total Phosphorous;
TH: Total Hardness;
TA: Total Alkalinity;
COD: Chemical Oxygen Demand;
TOC: Total Oil Content; and
DO: Dissolved Oxygen.

TABLE 2

Streams from Different Sources within Heavy Oil Recovery by Steam.

| Ion | NF | | IE | Heavy Oil Reservoir | | | |
|---|---|---|---|---|---|---|---|
| (mg/L) | PS | RS | RB | GW | BW | SW | PW |
| $Na^+$ | 1,185 | 1,502 | 13,283 | 51 | 1,798 | 8,757 | 13,500 |
| $Mg^{+2}$ | 30 | 162 | 1,332 | 64 | 145 | 1,242 | 1,056 |
| $Ca^{+2}$ | 158 | 486 | 6,987 | 56 | 760 | 1,404 | 736 |
| $Cl^-$ | 1,612 | 2,023 | 36,748 | 181 | 3,381 | 19,687 | 24,500 |
| $HCO_3^-$ | 3 | 9 | 0 | 124 | 162 | 424 | 1,123 |
| $SO_4^{-2}$ | 19 | 2,589 | 0 | 130 | 1,350 | 0.1 | 32 |
| $SiO_2$ | | | 0 | 0.4 | | 6.1 | 117 |
| TDS | 3,085 | 6,870 | 58,350 | 567 | 7,596 | 31,770 | 41,064 |
| TH | 427 | 1,879 | 22,930 | 402 | 2,509 | 8,602 | 6,170 |
| pH | 8.0 | 8.0 | 6.9 | 8.1 | 7.7 | 6.9 | 9.1 |

PS: NF Product Stream; RS: NF Reject Stream; RB: IE Reject Brine; GW: Groundwater; BW: Brackish Water; SW: Saline Water; and PW: Produced Water.

What is claimed is:

1. A method for de-scaling a saline stream that comprises calcium, bicarbonate, magnesium, or silica, and combinations thereof; said method comprising: (a) mixing said saline stream with an aluminum source and releasing the mixture in a first flashing stage to be contacted with a heat source to vent carbon dioxide, forming a first precipitate comprising calcium carbonate, calcium aluminate, or calcium silicoaluminate, and combinations thereof, thereby forming first pre-heated brine; and (b) releasing said first pre-heated brine in a second flashing stage to be contacted with an organic hydroxide source forming a second precipitate comprising magnesium hydroxide, magnesium silicates, or magnesium silicoaluminate, and combinations thereof, recovering said organic hydroxide source, and producing de-scaled pre-heated brine.

2. The method of claim 1, wherein said saline stream is derived from a wet emulsion stream at ambient temperature.

3. The method of claim 1, wherein said heat source comprises blowdown steam, return condensate, letdown steam, or steam from a heat rejection device, and combinations thereof.

4. The method of claim 1, wherein said aluminum source is selected from the group consisting of aluminum hydroxide, sodium aluminate, aluminum chloride, and combinations thereof.

5. The method of claim 1, wherein said organic hydroxide source is selected from the group consisting of isopropylamine, propylamine, dipropylamine, diisopropylamine, ethylamine, diethylamine, methylamine, dimethylamine, ammonia, and combinations thereof.

6. The method of claim 1, further comprising replacing step (a) by mixing said saline stream with said aluminum source and releasing the mixture in said first flashing stage to be contacted with said heat source and a portion of said organic hydroxide source in said first flashing stage to form a first precipitate comprising calcium carboaluminate, recover the portion of said organic hydroxide source, and produce said first pre-heated brine.

7. The method of claim 1, further comprising replacing step (a) by mixing said saline stream with said aluminum source and releasing the mixture in said first flashing stage to be contacted with said heat source and a first portion of said organic hydroxide source to form a first precipitate comprising calcium carboaluminate, recover the first portion of said organic hydroxide source, release the recovered first portion of said organic hydroxide source in said second flashing stage to at least maintain the pH in said second flashing stage higher than the pH in said first flashing stage, and produce said first pre-heated brine.

8. The method of claim 1, further comprising de-oiling said saline stream by a hydrophobic membrane prior to de-scaling.

9. The method of claim 1, further comprising using at least a portion of said de-scaled pre-heated brine in oil recovery systems.

10. The method of claim 1, further comprising distilling said de-scaled pre-heated brine by a multi-effect (ME) train that operates at a temperature range, wherein the first effect is at a highest temperature, and the last effect is at a temperature lower than the previous effect;
wherein said de-scaled pre-heated brine is sprayed onto the boiling tubes of said last effect, where after partial evaporation to produce vapor, is cascaded backward to each higher temperature effect in turn until said first effect, where is discharged as heated reject brine; and
wherein steam is passed into the boiling tubes of only said first effect, thereby vapor arising from brine partial evaporation in preceding higher temperature effect is passed into the boiling tubes of a subsequent lower temperature effect, where in condensing releases the latent heat to boil the brine in the subsequent effect, with the exception of vapor arising from said last effect where is condensed in a heat rejection condenser, thereby vapor condensate from each effect after said first effect passes out to the distillate line common to said ME train.

11. The method of claim 1, further comprising distilling said de-scaled pre-heated brine by a multi-effect (ME) train that operates at a temperature range, wherein the first effect is at a highest temperature, and the last effect is at a temperature lower than the previous effect;
wherein said ME train is further divided into a backward feed section (BFS) and a forward feed section (FFS);
wherein said de-scaled pre-heated brine is sprayed onto the boiling tubes of said last effect of said BFS, where after partial evaporation to produce vapor, is cascaded backward to each higher temperature effect in turn until said first effect, where is discharged as BFS heated reject brine;
wherein a first portion of steam is passed into the boiling tubes of only said first effect of said BFS, thereby vapor arising from brine partial evaporation in a preceding higher temperature effect is passed into the boiling tubes of a subsequent lower temperature effect, where in condensing releases the latent heat to boil the brine in the subsequent effect, with the exception of vapor arising from said last effect where is condensed in a BFS heat rejection condenser, thereby vapor condensate from each effect after said first effect in said BFS passes out to the distillate line common to said ME train;
wherein said BFS heated reject brine is sprayed onto the boiling tubes of said first effect of said FFS, where after partial evaporation to produce vapor, is cascaded forward to each lower temperature effect in turn until said last effect, where is discharged as reject brine; and
wherein a second portion of steam is passed into the boiling tubes of only said first effect of said FFS, thereby vapor arising from brine partial evaporation in a preceding higher temperature effect is passed into the boiling tubes of a subsequent lower temperature effect, where in condensing releases the latent heat to boil the brine in the subsequent effect, with the exception of vapor arising from said last effect where is condensed in a FFS heat rejection condenser, thereby vapor condensate from each effect after said first effect in said FFS passes out to the distillate line common to said ME train.

12. The method of claim 1, further comprising distilling said de-scaled pre-heated brine by a recycle-brine multi-effect (RB-ME) train that operates at a temperature range, wherein the first effect is at a highest temperature, and the last effect is at a temperature lower than the previous effect;
wherein said RB-ME train is further divided into a backward feed section (BFS) and a forward feed section (FFS);
wherein said de-scaled pre-heated brine is sprayed onto the boiling tubes of said last effect of said BFS, where after partial evaporation to produce vapor, is cascaded backward to each higher temperature effect in turn until said first effect, where is discharged as BFS heated reject brine;

wherein a first portion of steam is passed into the boiling tubes of only said first effect of said BFS, thereby vapor arising from brine partial evaporation in a preceding higher temperature effect is passed into the boiling tubes of a subsequent lower temperature effect, where in condensing releases the latent heat to boil the brine in the subsequent effect, with the exception of vapor arising from said last effect where is condensed in a BFS heat rejection condenser, thereby vapor condensate from each effect after said first effect in said BFS passes out to the distillate line common to said ME train;

wherein said BFS heated reject brine is sprayed onto the boiling tubes of said first effect of said FFS, where after partial evaporation to produce vapor, is cascaded forward to each lower temperature effect in turn until said last effect, where is discharged as reject brine;

wherein a second portion of steam is passed into the boiling tubes of only said first effect of said FFS, thereby vapor arising from brine partial evaporation in a preceding higher temperature effect is passed into the boiling tubes of a subsequent lower temperature effect, where in condensing releases the latent heat to boil the brine in the subsequent effect, with the exception of vapor arising from said last effect where is condensed in a FFS heat rejection condenser, thereby vapor condensate from each effect after said first effect in said FFS passes out to the distillate line common to said ME train; and wherein at least a portion of said reject brine is mixed with said de-scaled pre-heated brine to form a recycle brine stream prior to entering said last effect of said BFS.

13. A method for distilling de-scaled brine, said method comprising a multi-effect (ME) train that operates at a temperature range, wherein the first effect is at a highest temperature, and the last effect is at a temperature lower than the previous effect;

wherein said de-scaled brine is sprayed onto the boiling tubes of said last effect, where after partial evaporation to produce vapor, is cascaded backward to each higher temperature effect in turn until said first effect, where is discharged as heated reject brine; and wherein steam is passed into the boiling tubes of only said first effect, thereby vapor arising from brine partial evaporation in preceding higher temperature effect is passed into the boiling tubes of a subsequent lower temperature effect, where in condensing releases the latent heat to boil the brine in the subsequent effect, with the exception of vapor arising from said last effect where is condensed in a heat rejection condenser, thereby vapor condensate from each effect after said first effect passes out to the distillate line common to said ME train.

14. The method of claim 13, further comprising using at least a portion of said heated reject brine in oil recovery systems.

15. The method of claim 13, further comprising adding a forward feed section (FFS) to said ME train;

wherein said heated reject brine is sprayed onto the boiling tubes of the first effect of said FFS, where after partial evaporation to produce vapor, is cascaded forward to each lower temperature effect in turn until the last effect, where is discharged as reject brine; and wherein a second portion of steam is passed into the boiling tubes of only the first effect of said FFS, thereby vapor arising from brine partial evaporation in a preceding higher temperature effect is passed into the boiling tubes of a subsequent lower temperature effect, where in condensing releases the latent heat to boil the brine in the subsequent effect, with the exception of vapor arising from the last effect where is condensed in a FFS heat rejection condenser, thereby vapor condensate from each effect after the first effect in said FFS passes out to the distillate line common to said ME train.

16. The method of claim 13, wherein said de-scaled brine is generated by:

mixing a saline stream with an aluminum source and releasing the mixture in a first flashing stage to be contacted with a heat source to vent carbon dioxide, form a first precipitate comprising calcium carbonate, calcium aluminate, or calcium silicoaluminate, and combinations thereof, and produce first brine; and releasing said first brine in a second flashing stage to be contacted with an organic hydroxide source to form a second precipitate comprising magnesium hydroxide, magnesium silicates, or magnesium silicoaluminate, and combinations thereof, and produce said de-scaled brine;

wherein said saline stream is derived from a wet emulsion stream at ambient temperature;

wherein said saline stream comprises calcium, bicarbonate, magnesium, or silica, and combinations thereof;

wherein said heat source comprises blowdown steam, return condensate, letdown steam, or steam from a heat rejection device, and combinations thereof;

wherein said aluminum source is selected from the group consisting of aluminum hydroxide, sodium aluminate, aluminum chloride, and combinations thereof; and wherein said organic hydroxide source is selected from the group consisting of isopropylamine, propylamine, dipropylamine, diisopropylamine, ethylamine, diethylamine, methylamine, dimethylamine, ammonia, and combinations thereof.

17. The method of claim 13, wherein said de-scaled heated brine is further generated by:

mixing a saline stream with an aluminum source and releasing the mixture in a first flashing stage to be contacted with a heat source and a first portion of an organic hydroxide source to form a first precipitate comprising calcium carboaluminate, and produce first brine;

releasing said first brine in a second flashing stage to be contacted with a second portion of said organic hydroxide source to form a second precipitate comprising magnesium hydroxide, magnesium silicates, or magnesium silicoaluminate, and combinations thereof, and produce said de-scaled brine;

wherein said saline stream is derived from a wet emulsion stream at ambient temperature;

wherein said saline stream comprises calcium, bicarbonate, magnesium, or silica, and combinations thereof;

wherein said heat source comprises blowdown steam, return condensate, letdown steam, or steam from a heat rejection device, and combinations thereof;

wherein said aluminum source is selected from the group consisting of aluminum hydroxide, sodium aluminate, aluminum chloride, and combinations thereof; and wherein said organic hydroxide source is selected from the group consisting of isopropylamine, propylamine, dipropylamine, diisopropylamine, ethylamine, diethylamine, methylamine, dimethylamine, ammonia, and combinations thereof.

18. The method of claim 13, further comprising de-oiling a saline stream by a hydrophobic membrane at ambient temperature prior to generating said de-scaled brine.

19. A method for distilling de-scaled brine, said method comprising a recycle-brine multi-effect (RB-ME) train that operates at a temperature range, wherein the first effect is at a highest temperature, and the last effect is at a temperature lower than the previous effect;
   wherein said RB-ME train is further divided into a backward feed section (BFS) and a forward feed section (FFS);
   wherein said de-scaled brine is sprayed onto the boiling tubes of said last effect of said BFS, where after partial evaporation to produce vapor, is cascaded backward to each higher temperature effect in turn until said first effect, where is discharged as BFS heated reject brine;
   wherein a first portion of steam is passed into the boiling tubes of only said first effect of said BFS, thereby vapor arising from brine partial evaporation in a preceding higher temperature effect is passed into the boiling tubes of a subsequent lower temperature effect, where in condensing releases the latent heat to boil the brine in the subsequent effect, with the exception of vapor arising from said last effect where is condensed in a BFS heat rejection condenser, thereby vapor condensate from each effect after said first effect in said BFS passes out to the distillate line common to said ME train;
   wherein said BFS heated reject brine is sprayed onto the boiling tubes of said first effect of said FFS, where after partial evaporation to produce vapor, is cascaded forward to each lower temperature effect in turn until said last effect, where is discharged as reject brine;
   wherein a second portion of steam is passed into the boiling tubes of only said first effect of said FFS, thereby vapor arising from brine partial evaporation in a preceding higher temperature effect is passed into the boiling tubes of a subsequent lower temperature effect, where in condensing releases the latent heat to boil the brine in the subsequent effect, with the exception of vapor arising from said last effect where is condensed in a FFS heat rejection condenser, thereby vapor condensate from each effect after said first effect in said FFS passes out to the distillate line common to said ME train; and
   wherein at least a portion of said reject brine is mixed with said de-scaled brine to form a recycle brine stream prior to entering said last effect of said BFS.

20. The method of claim 19, wherein said de-scaled brine is generated by:
   mixing a saline stream with an aluminum source and releasing the mixture in a first flashing stage to be contacted with a heat source and a first portion of an organic hydroxide source to form a first precipitate comprising calcium carboaluminate, recover the first portion of said organic hydroxide source, and produce first brine;
   releasing said first brine in a second flashing stage to be contacted with a second portion of said organic hydroxide source, and the recovered first portion of said organic hydroxide source from said first flashing stage to at least maintain the pH in said second flashing stage higher than the pH in said first flashing stage, to form a second precipitate comprising magnesium hydroxide, magnesium silicates, or magnesium silicoaluminate, and combinations thereof, recover said organic hydroxide source, and produce said de-scaled brine;
   wherein said saline stream is derived from a wet emulsion stream at ambient temperature;
   wherein said saline stream comprises calcium, bicarbonate, magnesium, or silica, and combinations thereof;
   wherein said saline stream is subjected to de-oiling by a hydrophobic membrane prior to generating said de-scaled brine;
   wherein said heat source comprises blowdown steam, return condensate, letdown steam, or steam from a heat rejection device, and combinations thereof;
   wherein said aluminum source is selected from the group consisting of aluminum hydroxide, sodium aluminate, aluminum chloride, and combinations thereof; and
   wherein said organic hydroxide source is selected from the group consisting of isopropylamine, propylamine, dipropylamine, diisopropylamine, ethylamine, diethylamine, methylamine, dimethylamine, ammonia, and combinations thereof.

* * * * *